United States Patent
Mao et al.

(10) Patent No.: US 9,737,807 B2
(45) Date of Patent: Aug. 22, 2017

(54) CONTROLLER FOR INTERFACING WITH A COMPUTING PROGRAM USING POSITION, ORIENTATION, OR MOTION

(71) Applicant: Sony Interactive Entertainment Inc., Tokyo (JP)

(72) Inventors: Xiaodong Mao, Foster City, CA (US); Noam Rimon, Foster City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 111 days.

(21) Appl. No.: 14/788,692

(22) Filed: Jun. 30, 2015

(65) Prior Publication Data
US 2015/0321085 A1  Nov. 12, 2015

Related U.S. Application Data

(63) Continuation of application No. 14/214,150, filed on Mar. 14, 2014, now Pat. No. 9,067,139, which is a
(Continued)

(51) Int. Cl.
| | |
|---|---|
| *G06F 3/03* | (2006.01) |
| *G06F 3/0346* | (2013.01) |
| *A63F 13/42* | (2014.01) |
| *A63F 13/211* | (2014.01) |
| *G06T 7/20* | (2017.01) |
| *A63F 13/213* | (2014.01) |
| *A63F 13/52* | (2014.01) |
| *A63F 13/20* | (2014.01) |

(Continued)

(52) U.S. Cl.
CPC ............. *A63F 13/42* (2014.09); *A63F 13/06* (2013.01); *A63F 13/10* (2013.01); *A63F 13/211* (2014.09); *A63F 13/213* (2014.09); *A63F 13/52* (2014.09); *G06F 3/0304* (2013.01); *G06F 3/0325* (2013.01); *G06F 3/0346* (2013.01); *G06T 7/20* (2013.01); *G06T 7/70* (2017.01); *A63F 2300/1093* (2013.01); *A63F 2300/6045* (2013.01); *A63F 2300/66* (2013.01)

(58) Field of Classification Search
CPC ..... G06F 3/0304; G06F 3/0325; G06F 3/0346
See application file for complete search history.

(56) References Cited

U.S. PATENT DOCUMENTS

| | | |
|---|---|---|
| 6,489,945 B1 | 12/2002 | Gordon |
| RE40,410 E | 7/2008 | Gordon |

(Continued)

FOREIGN PATENT DOCUMENTS

| | | |
|---|---|---|
| CN | 1272285 | 11/2000 |
| WO | 2009/126772 | 10/2009 |

*Primary Examiner* — Steven J Hylinski
(74) *Attorney, Agent, or Firm* — Martine Penilla Group, LLP

(57) ABSTRACT

A method for determining the position of a controller device, comprises: receiving dimensions of the display input by a user of the computer-based system; capturing successive images of the display at the controller device; determining a position of the controller device relative to the display based on the dimensions of the display and a perspective distortion of the display in the captured successive images of the display; providing the determined position of the controller to the computer-based system to interface with the interactive program to cause an action by the interactive program.

15 Claims, 27 Drawing Sheets

Related U.S. Application Data continuation of application No. 12/623,352, filed on Nov. 20, 2009, now Pat. No. 8,672,763.

(51) Int. Cl.
*A63F 13/40* (2014.01)
*G06T 7/70* (2017.01)

(56) References Cited

U.S. PATENT DOCUMENTS

| | | |
|---|---|---|
| 2005/0104849 A1 | 5/2005 | Hoile |
| 2005/0270494 A1 | 12/2005 | Banning |
| 2006/0049579 A1* | 3/2006 | Miyamoto .............. G06F 3/039 273/148 B |
| 2006/0248462 A1 | 11/2006 | Ofek et al. |
| 2007/0013657 A1 | 1/2007 | Banning |
| 2008/0001918 A1* | 1/2008 | Hsu ......................... G06F 3/011 345/157 |
| 2008/0244466 A1 | 10/2008 | Orsley |
| 2009/0096768 A1 | 4/2009 | Ohira et al. |
| 2009/0122030 A1 | 5/2009 | Morimoto et al. |
| 2009/0262075 A1 | 10/2009 | Kimmel et al. |
| 2010/0201808 A1 | 8/2010 | Hsu |
| 2010/0253622 A1 | 10/2010 | Makita |

* cited by examiner

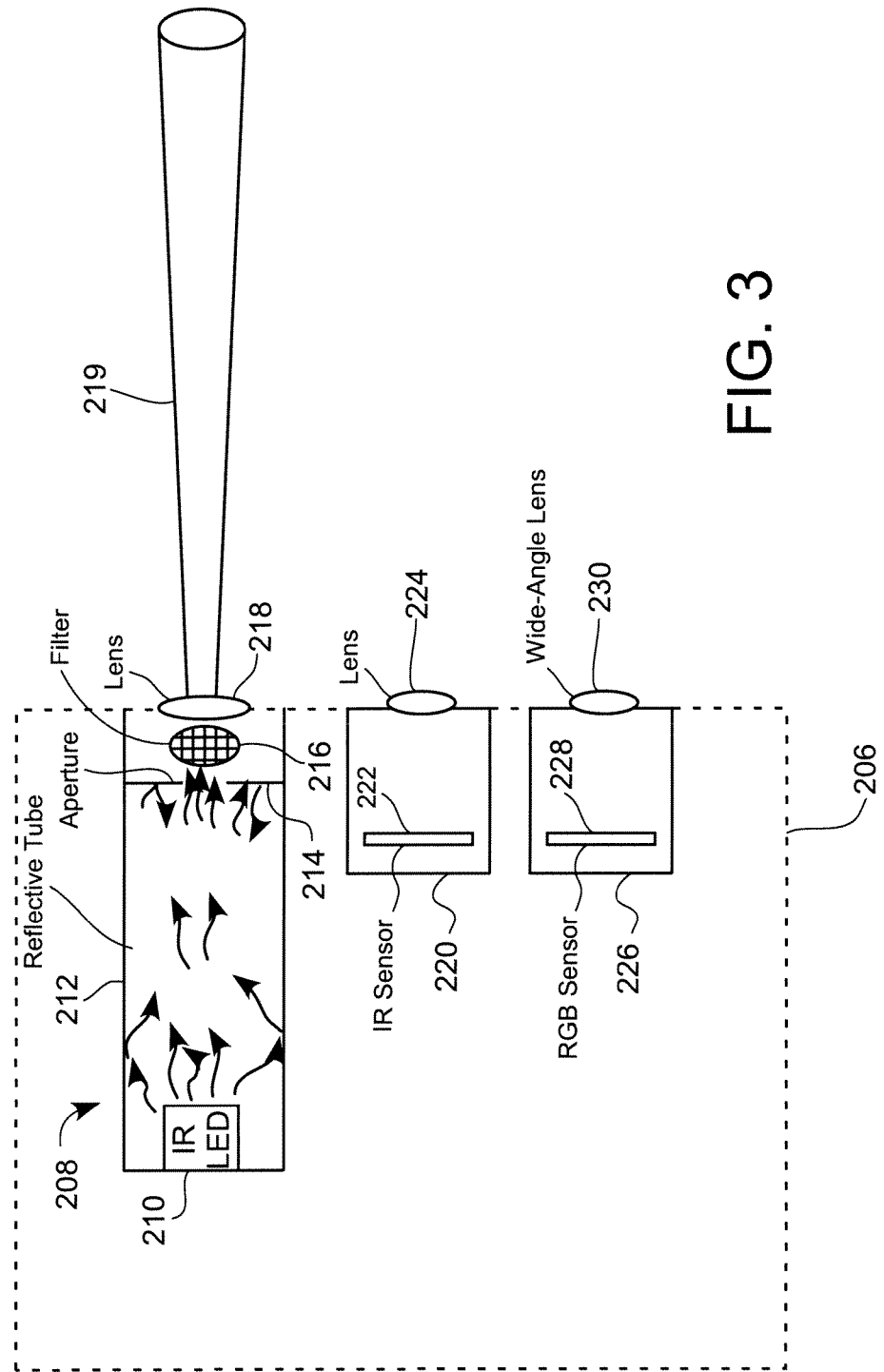

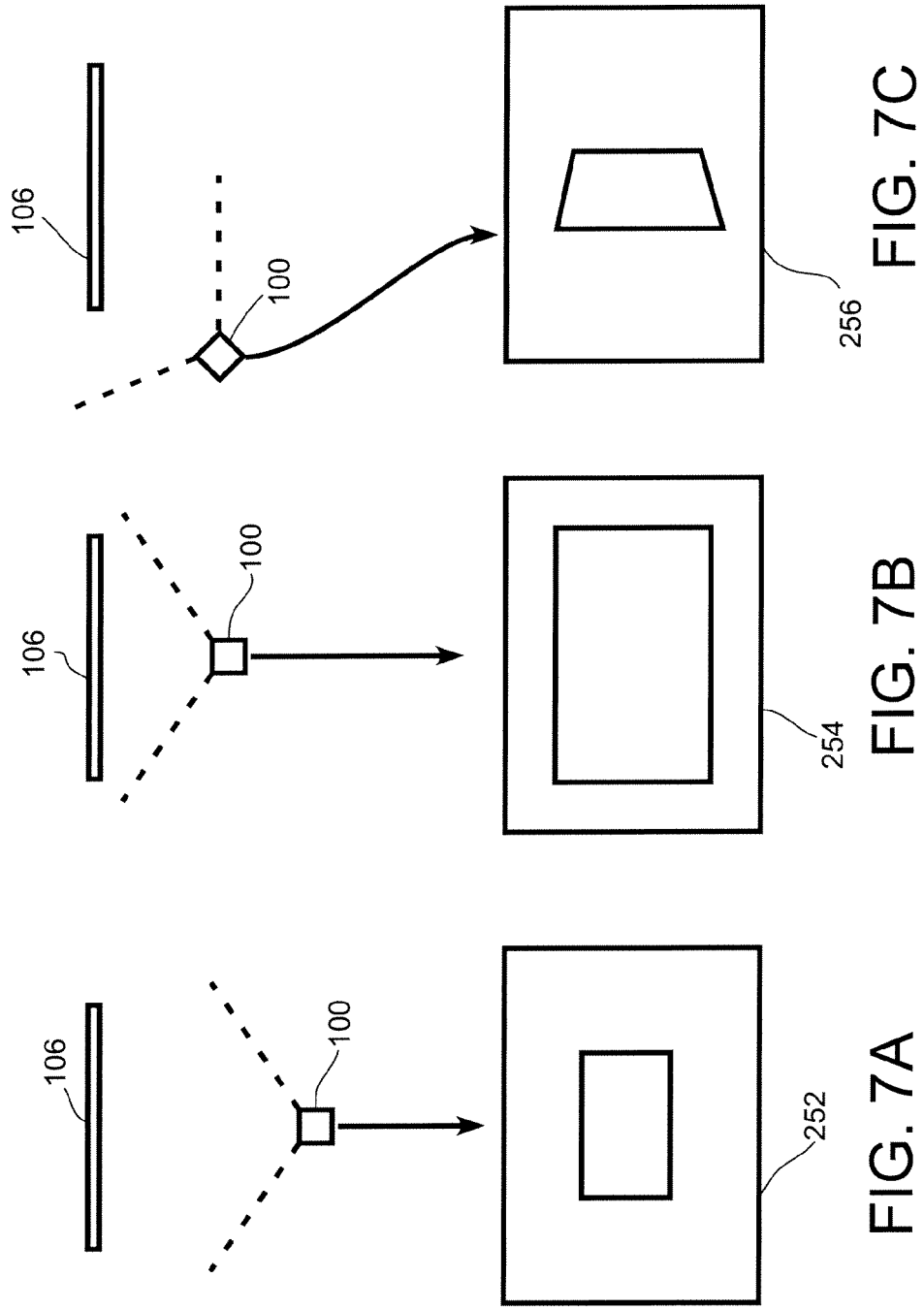

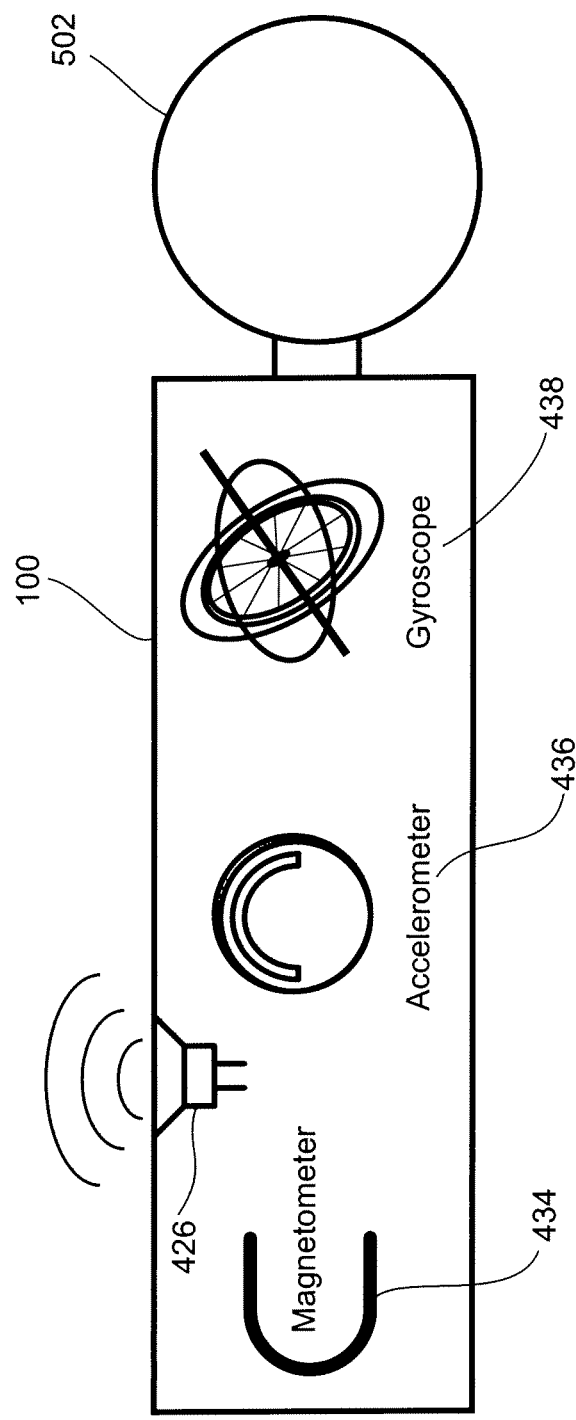

CONTROLLER FOR INTERFACING WITH A COMPUTING PROGRAM USING POSITION, ORIENTATION, OR MOTION

CLAIM OF PRIORITY

This application is a continuation of U.S. application Ser. No. 14/214,150, entitled "Controller for Interfacing with a Computing Program Using Position, Orientation, or Motion, filed Mar. 14, 2014, which is a continuation of U.S. application Ser. No. 12/623,352, entitled "Controller for Interfacing with a Computing Program Using Position, Orientation, or Motion", filed on Nov. 20, 2009, the disclosures of which are incorporated by reference herein.

CROSS REFERENCE TO RELATED APPLICATIONS

This application is related to application Ser. No. 12/953,375, filed Nov. 23, 2010 (now U.S. Pat. No. 8,348,760, issued Jan. 8, 2013) and Application Ser. No. 13/691,659, filed Nov. 30, 2012 , the disclosures of which are incorporated herein in its entirety.

BACKGROUND

1. Field of the Invention

The present invention relates to methods and systems for interfacing a control device with a computer device, and more particularly, methods and systems for interfacing a control device with a computer program executing at a base computing device.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), and Sony Playstation3® (PS3), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

It is in this context that embodiments of the invention arise.

SUMMARY

Embodiments of the present invention provide methods and systems for interfacing a control device with a computer program executing at a base computing device. It should be appreciated that the present invention can be implemented in numerous ways, such as a process, an apparatus, a system, a device or a method on a computer readable medium. Several inventive embodiments of the present invention are described below.

In one embodiment, in a computer-based system having a display and a controller device for interfacing with an interactive program, a method for determining the position of the controller device is provided. According to the method the computer-based system is initialized to establish a starting position of the controller device relative to the display. The method operation of initializing includes (i) capturing an image of the display using a camera integrated in the controller device; (ii) capturing an image of a radiation pattern projected by the controller device; and (iii) analyzing the captured image of the display and the image of the radiation pattern projected by the controller device to determine a size of the display in the captured image at a distance of the controller device as determined by the image of the projected radiation pattern.

Further according to the method for determining position, successive images of the display are captured at the controller device. Then, a position of the controller device relative to the display is determined based on a perspective distortion of the display in the captured successive images of the display. The determined position of the controller is provided to the computer-based system to interface with the interactive program to cause an action by the interactive program.

In one embodiment, an orientation of the controller device is determined based on a location and orientation of the display in the captured image of the display. In one embodiment, the orientation of the controller device is selected from the group consisting of pitch, roll, and yaw.

In one embodiment, the movement of the controller device is determined by tracking the position of the controller at the time of each captured successive image.

In one embodiment, the radiation pattern projected by the controller is generated by an IR projector.

In one embodiment, when the position of the controller device cannot be determined based on the captured successive images of the display, then auxiliary position determination is performed. First, the radiation pattern is projected from the controller device. Then successive images of the radiation pattern are captured at the controller device. And the position of the controller device is estimated based on the captured successive images of the radiation pattern.

In one embodiment, the operation of capturing an image of the display includes capturing an image of a portion of the display sufficient to enable determination of the size of the display.

In one embodiment, the operation of capturing successive images of the display includes capturing successive images of a portion of the display sufficient to enable determination of the position of the controller device.

In accordance with another embodiment of the invention, in a computer-based system having a display and a controller device for interfacing with an interactive program, a method for determining the position of the controller device is provided. First, dimensions of the display input by a user of the computer-based system are received. Then, successive images of the display are captured at the controller device. A position of the controller device relative to the display is determined based on the dimensions of the display and a perspective distortion of the display in the captured successive images of the display. Then, the determined position of the controller is provided to the computer-based system to interface with the interactive program to cause an action by the interactive program.

In one embodiment, the dimensions of the display include an aspect ratio of the display and a diagonal measurement of the display.

In accordance with another embodiment of the invention, a system for interfacing with an interactive program is provided. The system includes a display for displaying the interactive program. A controller device is provided for interfacing with the interactive program. The controller device includes a projector for projecting a radiation pattern, a first camera for capturing an image of the projected radiation pattern, and a second camera for capturing images of the display. Initialization logic is provided for initializing the system to establish a starting position of the controller device relative to the display. The initialization logic is configured to (i) capture an image of the display using the second camera; (ii) capture an image of a radiation pattern projected by the projector using the first camera; and (iii) analyze the captured image of the display and the image of the radiation pattern to determine a size of the display in the captured image at a distance of the controller device as determined by the image of the projected radiation pattern. Position determination logic is provided for determining the position of the controller device relative to the display. The position determination logic is configured to (i) capture successive images of the display at the controller device using the second camera, and (ii) determine a position of the controller device relative to the display based on a perspective distortion of the display in the captured successive images of the display. Communication logic provides the determined position of the controller to the computer-based system to interface with the interactive program.

In one embodiment, orientation determination logic is provided for determining an orientation of the controller device based on a location and orientation of the display in the captured successive images of the display. In one embodiment, the orientation of the controller device is selected from the group consisting of pitch, roll, and yaw.

In one embodiment, movement determination logic is provided for determining movement of the controller device by tracking the position of the controller at the time of each captured successive image.

In one embodiment, auxiliary position determination logic is configured to perform the following operations when the position of the controller device cannot be determined based on the captured successive images of the display: (1) projecting the radiation pattern from the controller device; (2) capturing successive images of the radiation pattern at the controller device; and (3) estimating the position of the controller device based on the captured successive images of the radiation pattern.

In one embodiment, the capture of an image of the display includes capture of an image of a portion of the display sufficient to enable determination of the size of the display.

In one embodiment, the capture of successive images of the display includes capture of successive images of a portion of the display sufficient to enable determination of the position of the controller device.

Other aspects of the invention will become apparent from the following detailed description, taken in conjunction with the accompanying drawings, illustrating by way of example the principles of the invention.

BRIEF DESCRIPTION OF THE DRAWINGS

The invention will be understood by reference to the following description taken in conjunction with the accompanying drawings in which:

FIG. 3 illustrates a detailed view of the motion capture subassembly, in accordance with an embodiment of the invention.

FIG. 7A illustrates a controller located in front of a display, such that the display appears in a captured image taken by an RGB camera of the controller, in accordance with an embodiment of the invention.

FIG. 7B illustrates a controller moved close to a display such that the display appears larger in an image captured at the controller, in accordance with an embodiment of the invention.

FIG. 7C illustrates a controller moved to the left side of a display, such that the image of the display as seen in a captured image taken at the controller exhibits perspective distortion resulting from the location of the controller, in accordance with an embodiment of the invention.

FIG. 16 illustrates a controller with sensors for improving movement tracking, in accordance with an embodiment of the invention.

DETAILED DESCRIPTION

The following embodiments describe methods and apparatus for interfacing a control device with a computer program executing at a base computing device by using visual cues for both user feedback and input to the computer program.

It will be obvious, however, to one skilled in the art, that the present invention may be practiced without some or all of these specific details. In other instances, well known process operations have not been described in detail in order not to unnecessarily obscure the present invention.

Throughout this detailed description of various exemplary embodiments of the invention, reference will be made to analysis of images to determine objects or the properties of objects within the images. Such analysis may employ any of various image recognition methods and techniques as are known in the art, without departing from the spirit and scope of the invention.

Figure 1:
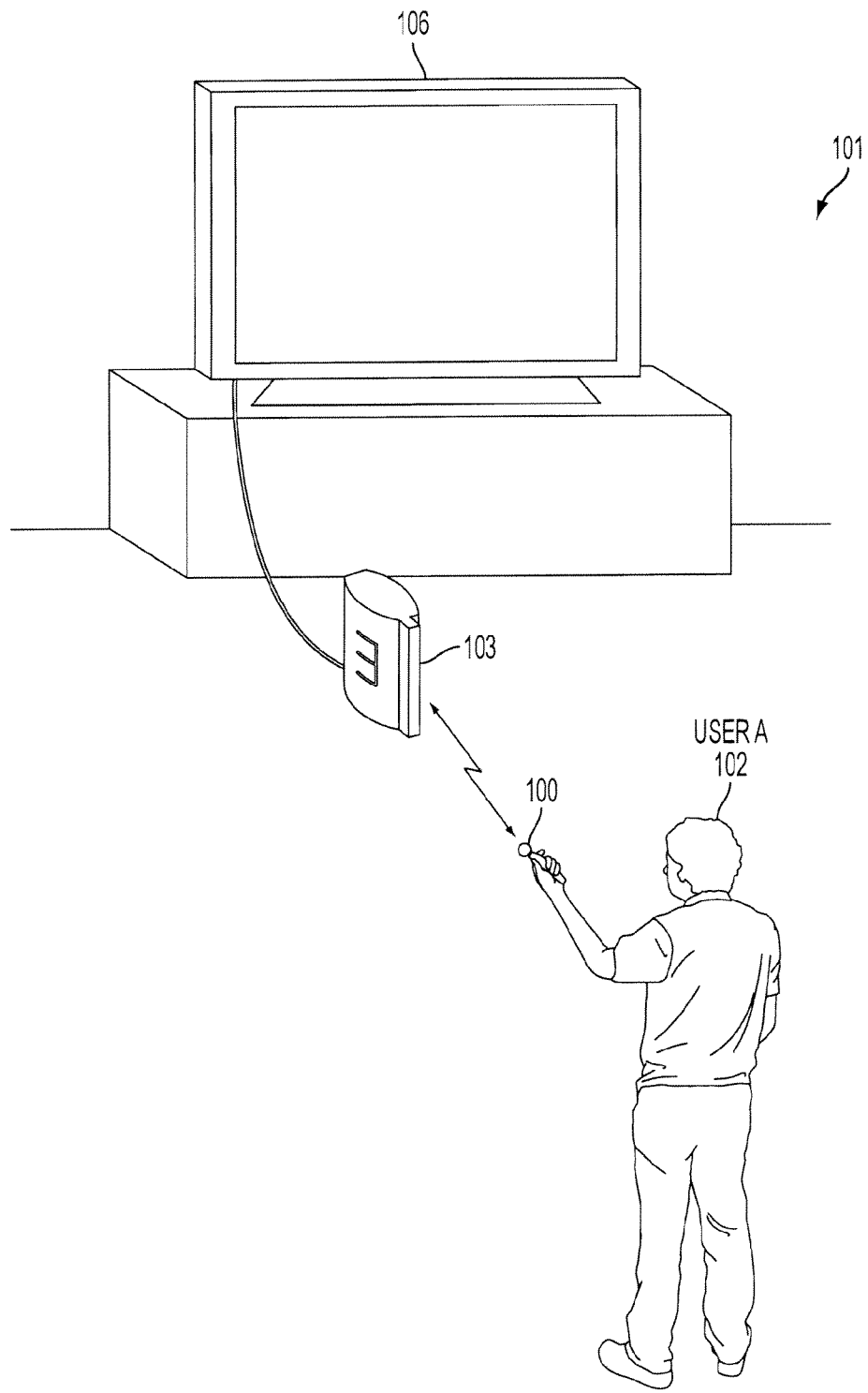
FIG. 1 illustrates a generic interactive system, in accordance with an embodiment of the invention.

FIG. 1 illustrates a generic interactive system 101. The system includes a computer 103 and a display 106. In various embodiments, the computer 103 may be a general purpose computer, a special purpose computer, a gaming console, or other such device which executes an interactive program that is rendered on the display 106. Examples of gaming consoles as are known in the art include those manufactured by Sony, Microsoft, Nintendo, and the like. The display 106 may be a television, a monitor, a projector display, or other such displays and display systems which are capable of receiving and rendering video output from the computer 103. A user 102 provides input to the interactive program by moving a controller 100. In a preferred embodiment, the controller 100 communicates wirelessly with the computer 103, as this provides for greater freedom of movement of the controller than a wired connection.

Figure 2:
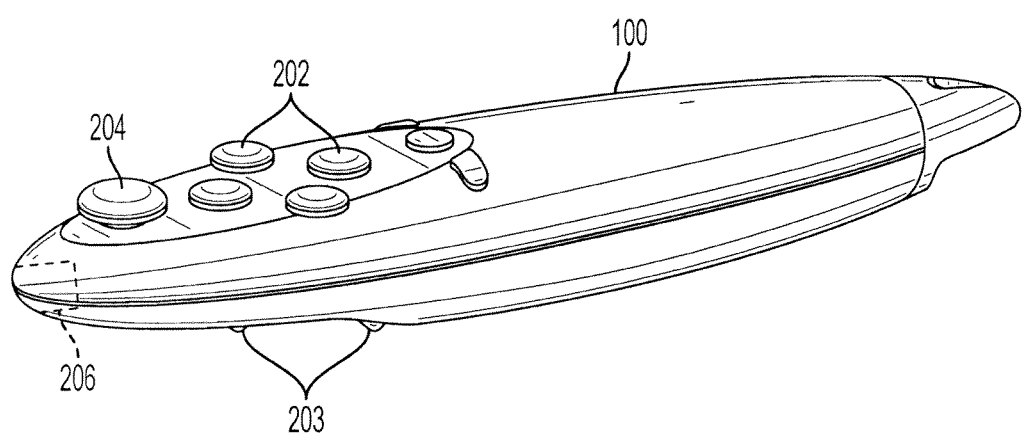
FIG. 2 illustrates an exemplary controller device, in accordance with an embodiment of the invention.

FIG. 2 illustrates an exemplary controller 100. The controller 100 as shown is designed to be handheld by the user 102. Various buttons 202 are included for providing input to the interactive program. The particular functions of the buttons 202 are determined by the interactive program, and each of the buttons 202 may or may not be configurable or assignable by the user 102 in accordance with specifications of the interactive program. Trigger buttons 203 and joystick 204 provide additional intuitive mechanisms for generating user input. Though the controller 100 as shown is designed to be handheld, in other embodiments of the invention, the controller 100 may be designed for manipulation by the user 102 in other ways. For example, the controller 100 may be attached to the user 102 by means which are known in the art, such as a strap or harness. Or the controller 100 may be mounted to or take the form of an object which may be moved under the control of the user 102. For example, the controller 100 may be part of a steering wheel assembly, an instrument-like device, or other devices or assemblies which may exhibit movement for the purpose of providing input to the interactive program. Additionally, the controller 100 includes a motion capture subassembly 206, which consists of various hardware components specialized to enable determination of the position and motion of the controller 100.

It will be understood by those skilled in the art that the use of the terms motion capture, motion controller, and the like are to be broadly construed. Motion capture may include capture of position and orientation at specific points in time, as well as the capture of changes in position and orientation occurring over time. Position will generally be described with reference to a location in a three-dimensional space (e.g. as indicated by x, y, z coordinates). Orientation will generally be described in terms of pitch, yaw and roll.

FIG. 3 illustrates a detailed view of the motion capture subassembly 206. An IR projector 208 is included for generating a beam of IR or near-IR radiation 219. The IR projector 208 includes an IR LED which emits radiation in the IR or near-IR spectrum. In one embodiment, the IR LED 210 is disposed at one end of a reflective tube 212. Radiation emitted by the IR LED is harnessed within the reflective tube 212. At the opposite end of the reflective tube 212, an aperture 214 is provided which allows radiation to escape from the reflective tube 212, so that radiation passing through the aperture 214 is substantially focused in a single direction. In one embodiment, the radiation then passes through an IR cut filter 216, which blocks selective portions of the radiation so as to form a pattern. (In one embodiment, the filter 216 may also be referred to as an IR-PASS filter, which operates as a physical shutter; the IR-PASS filter defines the image pattern of the beam) The pattern formed by the IR cut filter 216 may have any configuration or shape which may be useful for generating a beam of radiation whose reflected image may be analyzed for perspective distortion. In various embodiments, the pattern formed by the IR cut filter may be triangular, grid-like, circular, etc. Radiation passing through the IR cut filter is further focused by a lens 218, resulting in a patterned radiation beam 219 that is emitted from the IR projector 208. In another embodiment, no filter is used so that the radiation is emitted without a specific pattern.

The IR radiation beam generally expands in cross-sectional area as distance from the projector 208 increases. In other words, a width or diameter of the beam increases as distance from the projector 208 increases. When the radiation beam 219 strikes a surface, it generates an IR projection of its pattern on the surface. In one embodiment, the projector is an infrared narrow beam projector which projects an invisible near-IR spectrum beam pattern.

The IR projection generated when radiation beam 219 strikes a surface is captured as an IR image by an IR camera 220. The IR camera 220 is substantially aligned with the IR projector 208 so as to be directed towards an IR projection generated when the radiation beam 219 strikes a surface. The IR camera 220 includes lens 224 which focuses radiation onto an IR image sensor 222. In one embodiment the lens 224 has a relatively narrow field of view so as to primarily capture the IR projection while generally excluding other portions of a scene. The IR image sensor receives IR radiation and generates a digital output of IR image data. In one embodiment, the IR camera includes a CMOS camera sensor with QVGA resolution at 60 frames per second (fps). In other embodiments, the camera may employ other imaging technologies (e.g. CCD sensor) at different resolutions and having higher or lower frame rates (.e.g. 120 fps, 240 fps), etc.

The motion capture subassembly 206 also includes an RGB camera 226 for capturing RGB images. The RGB camera 226 includes a wide-angle lens 230 to provide a large field of view. In one embodiment, the wide-angle lens is a fish-eye lens. In other embodiments, multiple wide-angle lenses are utilized so as to provide greater field of view coverage. In other embodiments, different types of lenses may be utilized in combination, such as a fish-eye lens and other lenses. The wide-angle lens 230 focuses light onto an RGB image sensor 228, which generates a digital output of RGB image data. In one embodiment, the RGB camera has QVGA resolution at 60 fps. In one embodiment, the pointing direction of the RGB camera can be adjusted by the user via mechanical means either manually or through actuators as are known in the art.

Figure 4A:
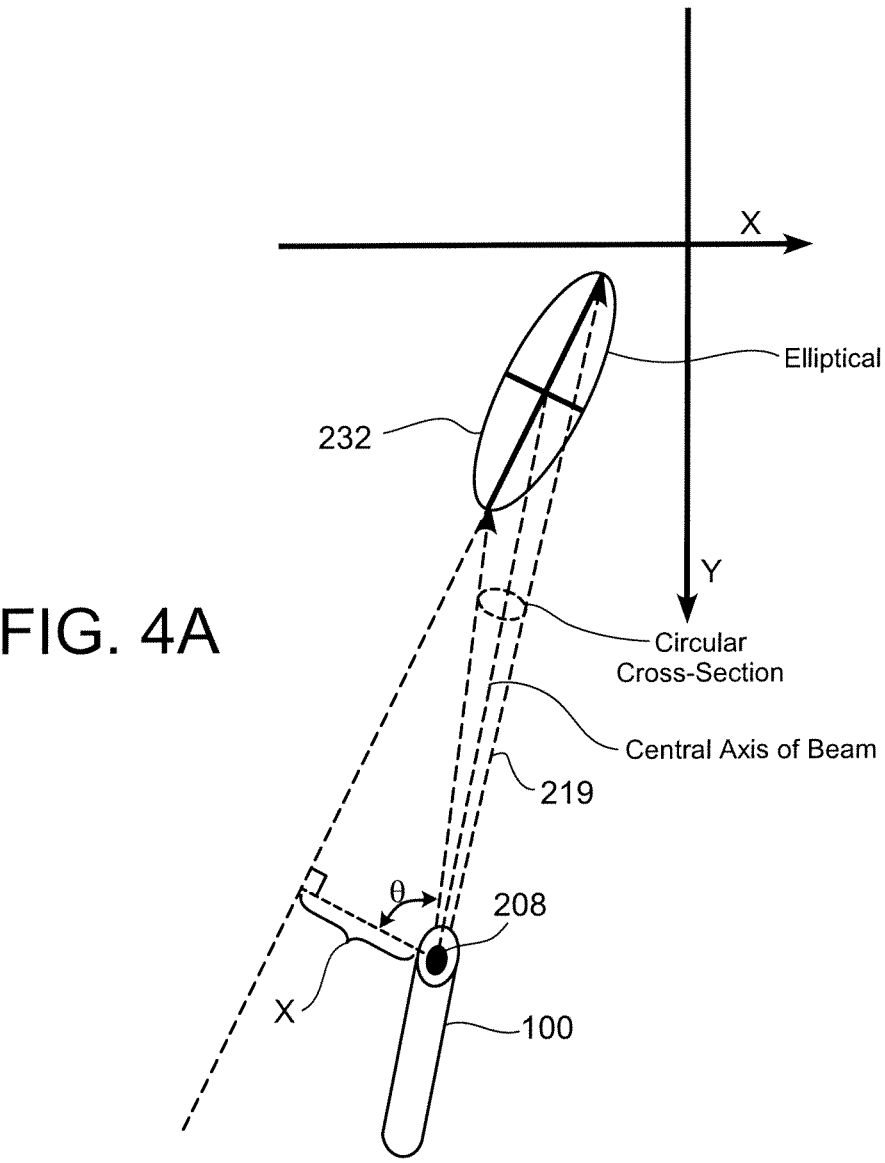
FIG. 4A, illustrates a controller with an IR projector emitting a patterned radiation beam towards a surface, in accordance with an embodiment of the invention.

With reference to FIG. 4A, a controller 100 is shown with an IR projector 208 emitting a patterned radiation beam 219 towards a surface denoted by X and Y axes. As the radiation beam 219 strikes the surface, an IR projection 232 of the IR beam 219 is generated on the surface. The radiation beam 219 as shown has a circular cross-section, and expands as distance from the IR projector 208 increases. Thus, the radiation beam 219 is frustoconical in shape. The deviation of the central axis of the radiation beam 219 away from orthogonal to the surface is shown as an angle θ. When the central axis of the radiation beam 219 is oriented orthogonal to the surface (θ=0 degrees), then there is no distortion of the pattern of the beam 219 in the projection 232. In other words, the projection will simply be a circle whose diameter varies as a function of distance from the projector 208, increasing as distance increases.

However, when the radiation beam 219 is not oriented orthogonal to the surface, then the projection 232 exhibits distortion of the cross-sectional pattern of the beam created by the angled orientation of the radiation beam 219. As the angle θ increases from zero degrees, so the distortion of the cross-sectional pattern of the beam exhibited by the projection 232 becomes more exaggerated. Because the radiation beam 219 in the present example is frustoconical, the projection 232 will be distorted to be elliptically shaped when the axis of the radiation beam 219 is not orthogonal to the surface. The eccentricity of the elliptical shape will increase as θ increases from zero degrees, and the size increases as the distance of the IR projector 208 from the projection 232 increases.

The projection 232 is captured as an IR image by the IR camera 220. By analyzing the size, shape, orientation and intensity of the projection in the captured IR image, it is possible to determine certain aspects of the orientation and position of the controller 100. The angle θ can be determined based on the shape of the projection 232 (θ increases as the distortion increases), and the distance from the projection 232 to the IR projector 208 can be determined based on the size of the projection 232. Once the angle θ and the distance from the projection 232 to the projector 208 are known, the distance Z from the projector 208 to the plane of the surface can be determined as cos(θ) multiplied by the distance from the projection 232 to the projector 208.

By analyzing the orientation of the pattern of the projection 232 it is possible to determine the orientation of the controller in certain relative terms. However, it is not possible to determine the orientation of the controller in terms of pitch, yaw, and roll, in an absolute sense. For example, the projection 232 generated by a controller 100 having a 45 degree pitch and 90 degree roll would appear the same as that of a controller 100 having a negative 45 degree yaw, as captured by the IR camera 220. However, relative to the surface it is possible to determine the deviation from orthogonal, and orientation, as well as certain relative movements of the controller 100 over time.

In one embodiment, the captured IR image pattern may be used for calibration of fish-eye distortion if a fish-eye lens is used as part of the motion capture subassembly.

Figure 4B:
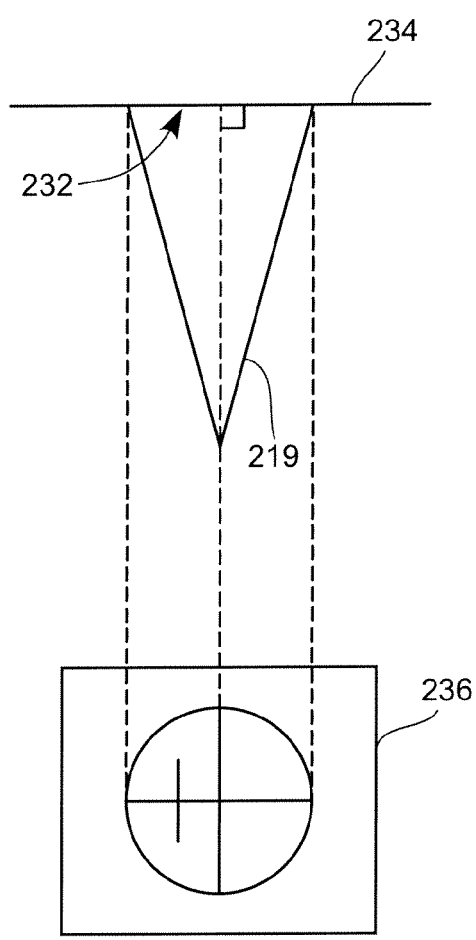
FIG. 4B illustrates a cross-sectional view of a conically shaped patterned radiation beam generated by a controller striking a surface, in accordance with an embodiment of the invention.

FIG. 4B shows a cross-sectional view of a conically shaped patterned radiation beam 219 generated by a controller 100 striking a surface 234. Note that the relative dimensions of the beam 219 have been exaggerated for illustrative purposes only. The axis of the beam is orthogonal to the surface 234, so as to produce a projection 232 whose image as captured by IR camera 220 is shown at 236. Because the beam is conically shaped and orthogonal to the surface 234, the projection is circular, as shown in the image 236. In order to facilitate evaluation of the image 236 to determine orientation of the controller 100, the pattern of the beam 219 is configured so as to be symmetric across no more than one axis.

Figure 4C:
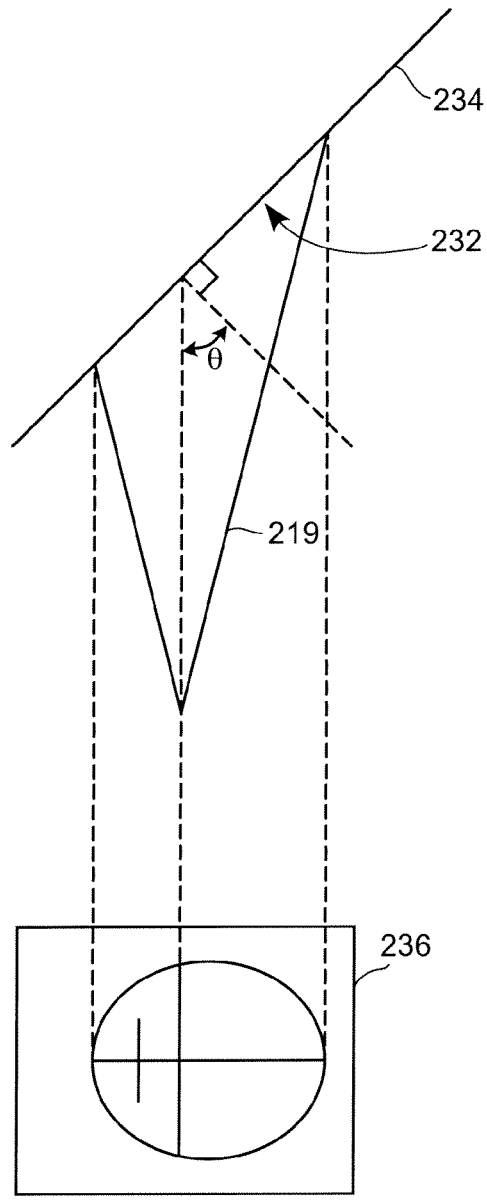
FIG. 4C illustrates a radiation beam deviated by an angle θ from an orthogonal to a surface, in accordance with an embodiment of the invention.

FIG. 4C shows the beam 219 deviated by an angle θ from an orthogonal to the surface 234. As a result, the projection 232 is distorted so as to be elliptically shaped. In the image 236, the pattern of the projection 232 appears distorted (elongated and shifted in the image field of view) accordingly.

Figure 4D:
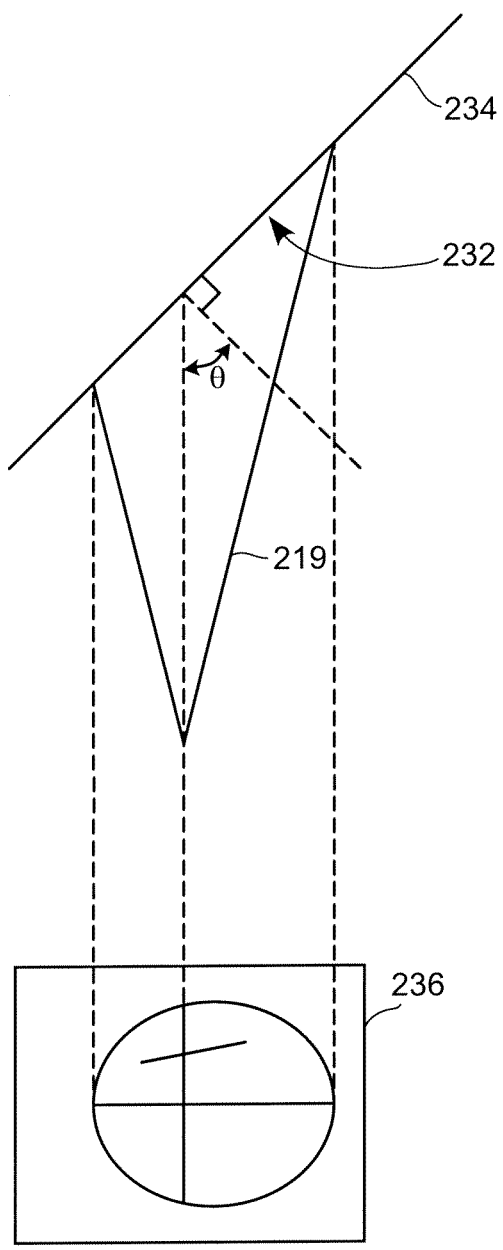
FIG. 4D illustrates a radiation beam in a similar configuration as that shown at FIG. 4C, wherein the controller has been rotated by 90 degrees, in accordance with an embodiment of the invention.

FIG. 4D illustrates the beam 219 in a similar configuration as that shown at FIG. 4C; however, the controller 100 has been rotated by 90 degrees. Hence, the projection 232 is distorted in the same manner due to the angle θ of deviation from orthogonal, but the orientation of the distorted pattern in the projection is different as seen in the image 236.

In sum, because the projection 232 will be distorted in predictable ways at various distances and angles of incidence, it is possible to determine for the controller 100 its angle of deviation from orthogonal, distance from the surface, and relative orientation, based on analysis of the IR image 236 taken of the IR projection 232. While the foregoing example has been described with reference to a conically shaped IR beam having a specific pattern, the same principles as those discussed above may be applied to a beam having any of various other shapes and patterns, without departing from the scope of the present invention.

Furthermore, by tracking and analyzing the IR projection 232, the relative motion and changes in orientation of the controller 100 can be determined in accordance with the principles and methods described above.

Figure 4E:
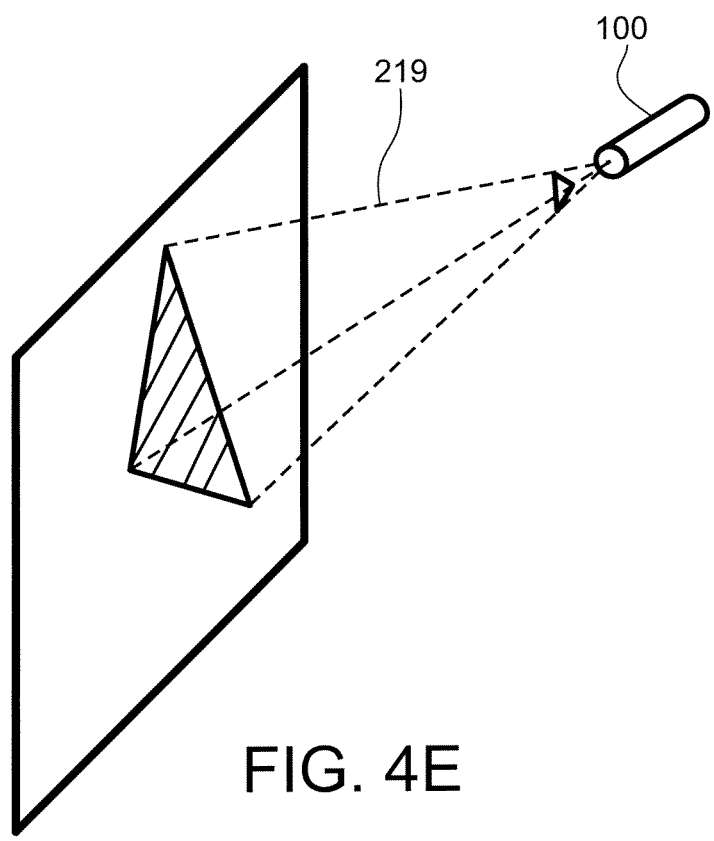
FIG. 4E illustrates a controller emitting an IR beam having a triangular patterned cross-sectional shape.

FIG. 4E illustrates a controller 100 emitting an IR beam 219 having a triangular patterned cross-sectional shape. It is recognized that the IR beam 219 may have any of various shapes and patterns without departing from the scope of the present invention. In some embodiments, the pattern of the IR beam will be wholly asymmetrical along any axis. In other embodiments, the pattern of the IR beam is symmetrical along no more than one axis.

In accordance with various embodiments of the invention, it is recognized that where the focal point of the beam 219 and the focal point of camera 220 are the same or substantially the same, then the difference in captured images of the projection 232 as the controller 100 is moved to different positions and orientations may not be detectable. Therefore, in embodiments of the invention, the projector 208 and the camera 220 are arranged so that their focal points do not coincide, but rather are offset from one another. The offset is sufficient to permit detection of differences in captured images of the projection 232 taken by the camera 220 as the controller is moved to different positions and orientations. In one embodiment the projector 208 and camera 220 may be arranged so that their focal points differ in terms of distance as measured along the axis of the beam 219. In another embodiment, the focal points are offset laterally from one another relative to the axis of the beam 219. In still another embodiment, the focal points differ both along the axis of the beam 219 and laterally, as well.

As noted with reference to FIG. 3A, the controller 100 includes an RGB camera 226. In accordance with embodiments of the invention, the RGB camera 226 is used to determine absolute position of the controller 100 by tracking the display 106. More specifically, images of the display 106 captured by the RGB camera 226 will demonstrate perspective distortion depending on the position of the controller 100. When the controller 100 (and by extension, the camera 226) moves closer to the display 106, the display will appear larger in the captured image; whereas when the controller 100 moves farther from the display 106, the display will appear smaller in the captured image. As the controller is moved to different locations and oriented at various pitch, yaw and roll values, the display will appear in various parts of the field of view and exhibit perspective distortion in a predictable manner. As such, the location and orientation of the controller 100 may be determined by analyzing the captured image of the display 106 taken by the RGB camera 226.

To facilitate determination of absolute position of the controller 100 by the RGB camera 226, a calibration is performed in which the dimensions of the display 106 are ascertained. Once the dimensions are known, it is possible to determine the position and orientation of the controller by analyzing captured images of the display 106 taken by RGB camera 226. In one embodiment, the dimensions of the display 106 are manually entered by a user of the interactive program. The dimensions may be entered numerically, selected from a list of options, or otherwise entered using any of various textual and graphical interfaces as are known in the art. In one embodiment, a user selects from amongst various aspect ratios and screen diagonal sizes. In another embodiment, the user selects from various display resolutions and screen diagonal sizes.

Figure 5:
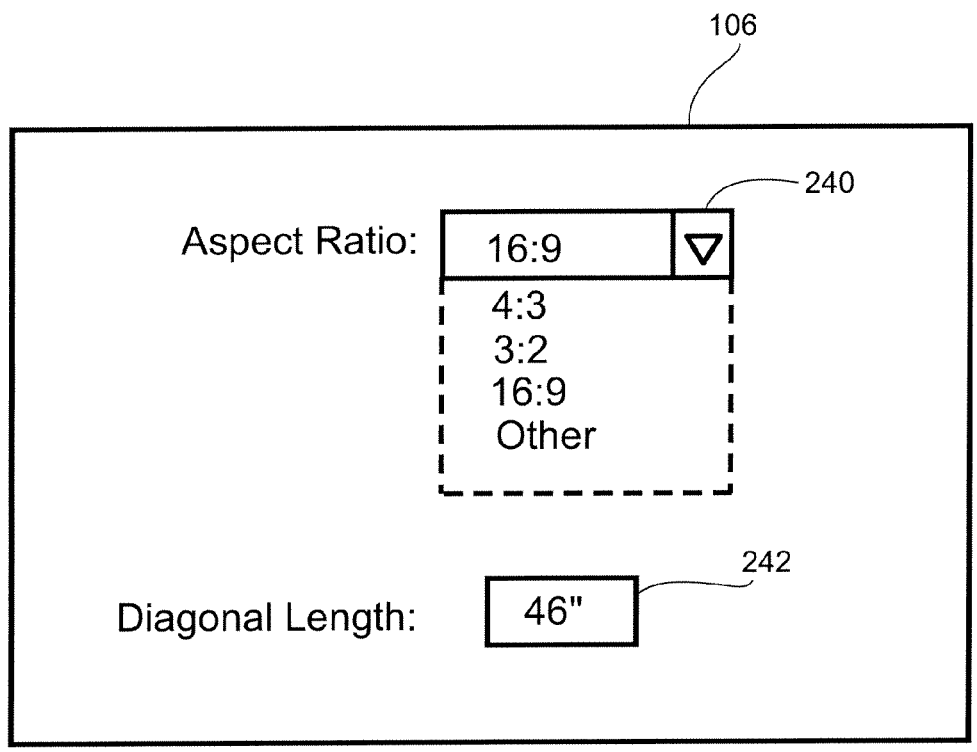
FIG. 5 illustrates a user interface for entering the dimensions of a display, in accordance with an embodiment of the invention.

With reference to FIG. 5, an example of a user interface for entering the dimensions of a display 106 is shown. It should be understood that many different styles or configurations of user interfaces are possible, the presently described embodiment being merely one illustrative example. The user interface includes an aspect ratio selection menu 240 from which a user may select the appropriate aspect ratio. Common aspect ratios of displays are included such as 4:3, 3:2, and 16:9. If a user selects "other" then the user will be able to numerically specify a different aspect ratio. Also, a diagonal length measurement entry box 242 is included wherein a user may enter the diagonal length of the display 106. The unit length may be entered in inches, as shown, or using other units of measurement, such as centimeters, meters, feet, etc. In still other embodiments, the dimensions of the screen can be obtained by the computing device (e.g., console) by way of a software request or look-up based on the type of screen that is connected to the computing device. This may occur automatically or at the direction of a user.

In another embodiment, the dimensions of the display are determined by utilizing the IR functionality of the controller 100 in conjunction with the RGB camera 226. First, the display 106 is caused to display a black image, or some other still image or pattern for calibration purposes. Then, the user points the controller towards the display. The IR projector 208 emits a near-IR/IR radiation beam which produces an IR projection of the beam pattern on the display 106. The IR camera 220 captures an IR image of the IR projection, which is then analyzed to determine the distance Z of the controller 100 from the display 106 and the relative orientation of the controller 100 based upon the distortion and size of the IR projection. The RGB camera simultaneously captures an image of the display, and the RGB image is analyzed to detect the outer frame of the display 106. As the distance Z and relative orientation of the controller 100 are known from the IR image analysis, the RGB image can be analyzed to determine the dimensions of the display 106. More specifically, the dimensions can be determined by analyzing the size and perspective distortion of the display in the RGB image in view of the known distance Z and relative orientation of the controller 100.

In one embodiment, prior to detection of the outer frame of the display in the RGB image, the display 106 is configured to render a pattern so as to aid in the detection of the outer frame of the display 106. For example, the display 106 may render a single color which contrasts with the color of the outer frame of the display 106. Or the display 106 may be caused to render bars along the borders of its screen, thus highlighting the borders and the corners of the display 106. In one embodiment, the bars exhibit at least two different colors or patterns which indicate the top, bottom, left and right sides of the display 106. In one embodiment, the display 106 is caused to render a pattern which highlights the corners of the display. In one embodiment, the display 106 renders a pattern of a preset number of segments which can serve as aids in determining the outer frame of the display 106 as well as its dimensions. In other embodiments of the invention, the display 106 may be configured to render any type of pattern or image which is suitable for aiding detection of the outer frame of the display 106 by analysis of an RGB image of the display.

Figure 6A:
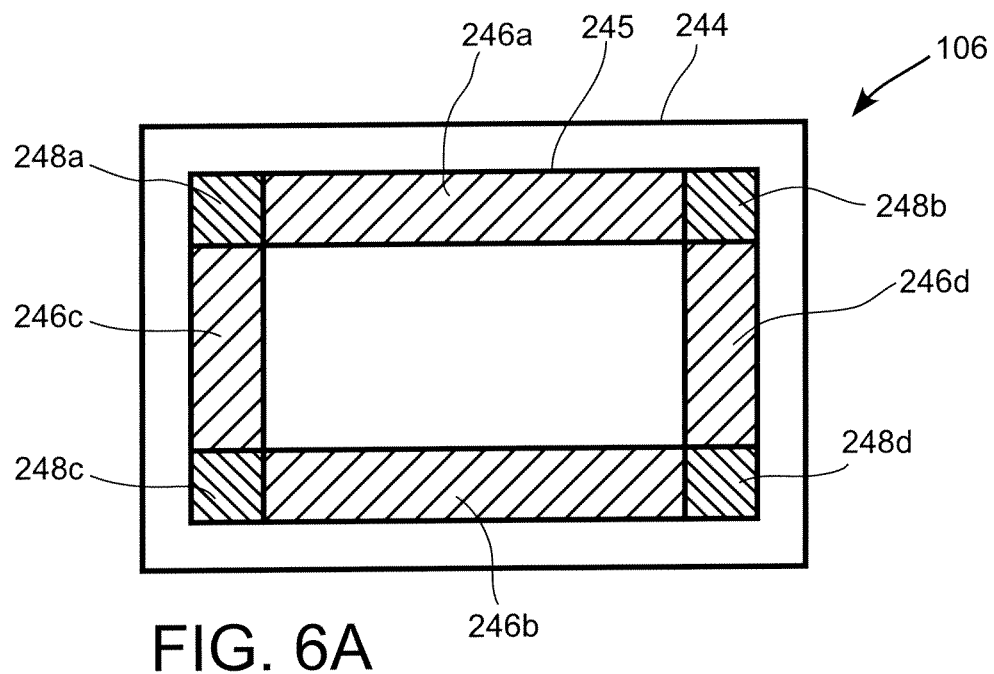
FIG. 6A illustrates an example of a pattern for aiding in detection of the outer frame of a display, in accordance with an embodiment of the invention.

With reference to FIG. 6A, one example of a pattern for aiding in detection of the outer frame of a display 106 is shown, in accordance with an embodiment of the invention. The display 106 includes an outer frame 244 and a screen 245 which constitutes the display area of the display 106. Bars 246a, 246b, 246c, and 246d are located at the top, bottom, left and right sides of the display 106, respectively, and thus highlight those sides of the outer frame 244. The bars 246a-246d may have the same color or pattern, or may have different colors or patterns. In one embodiment, each of the bars has a slightly different color to reduce the visual impact. Moreover, the colors may change in real-time in accordance with colors being displayed on the display so as to reduce the visual impact. This color information may be sent to the controller to improve detection accuracy by color correlation. Corner areas 248a, 248b, 248c, and 248d are regions specifically located at the top left, top right, lower left, and lower right corners of the screen 245. These corner areas 248a-248d thus highlight the corners of the outer frame 244. The corner areas 248a-248d may have the same pattern or color, or may have different patterns or colors. By providing a preset display pattern on the screen 245, such as the foregoing bars and corner areas, an RGB image taken of the display 106 can be analyzed to determine the location of the preset display pattern. And with reference to the preset display pattern in the RGB image, which defines the boundary between the screen 245 and the outer frame 244, the outer frame 244 of the display 106 can then be detected more easily.

Figure 6B:
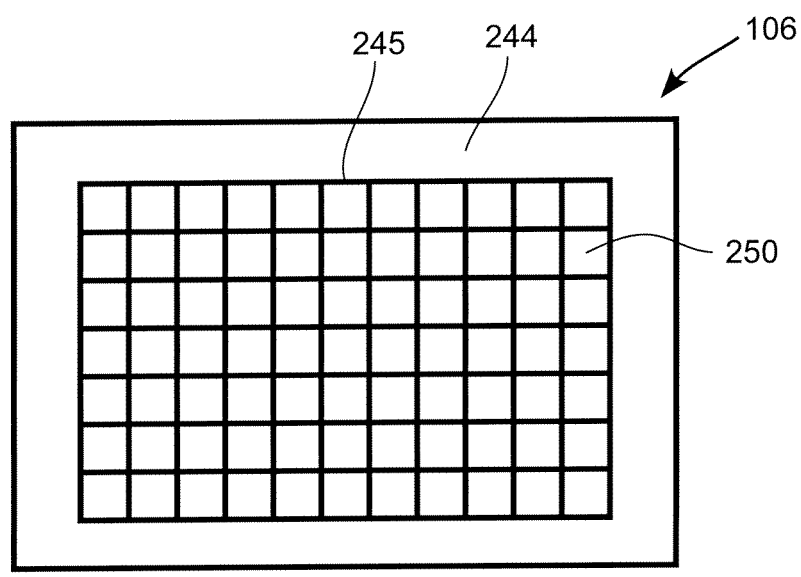
FIG. 6B illustrates an example of a pattern for aiding in detection of the outer frame of a display, in accordance with an embodiment of the invention.

With reference to FIG. 6B, an example of a pattern for aiding in detection of the outer frame of a display 106 is shown, in accordance with an embodiment of the invention. As shown, the pattern displayed on the screen 245 of the display 106 is a grid-like pattern 250. Such a pattern may serve to highlight and better enable detection of the outer frame 244 of the display 206. Additionally, the use of such a pattern may also help to reveal distortions inherent in the screen 245.

To determine the position, orientation, and movement of the controller 100 during activity with the interactive program, the controller 100 utilizes its RGB camera 226 to track the outer frame of the display. As the controller is moved to different positions and orientations, so the size, shape, and orientation of the display 106 in images captured by the RGB camera 226 changes accordingly. These changes in the RGB image of the display 106 are the result of both perspective distortion and the optical qualities of the lens 230 in the RGB camera 226.

With reference to FIGS. 7A, 7B, and 7C, overhead views of the controller 100 at various locations in relation to the display 106 are shown. In FIG. 7A, the controller 100 is located in front of the display 106, such that the display 106 appears in a captured image 252 taken by the RGB camera 226 as shown. In FIG. 7B, the controller 100 has been moved closer to the TV. The result as shown in the captured image 254 is that the display 106 appears larger in the image when the controller 100 is closer to the display 106. At FIG. 7C, the controller 100 has been moved to the left side of the display 106. As a result, the image of the display 106 as seen in the captured image 256 exhibits perspective distortion resulting from the location of the controller 100. The left side of the display 106 appears taller in the image 256 than the right side of the display 106, and the overall appearance of the display 106 appears to be shortened in width. The perspective distortion effects resulting from movement of the controller 100 are predictable, and as such, the location of the controller 100 can be determined by examining captured images of the RGB camera 226 and analyzing the perspective distortion of the display.

Figure 7F:
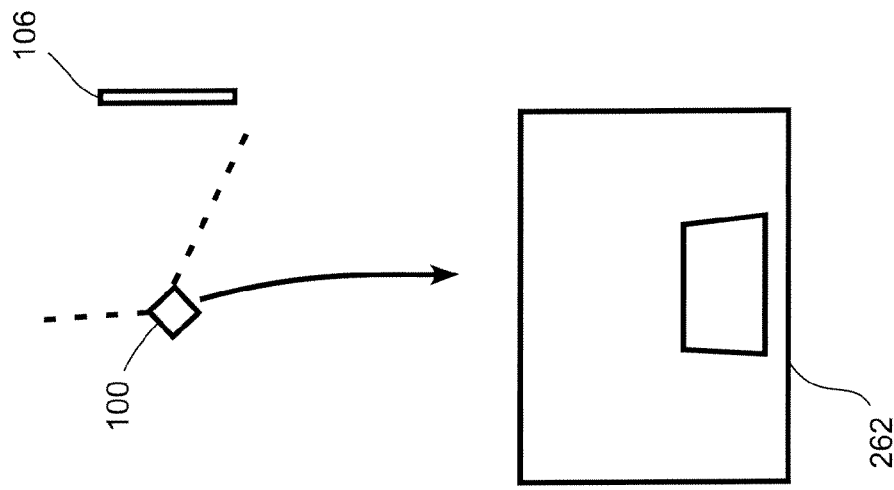
FIG. 7F illustrates a side view of a controller, wherein the pitch of the controller has been positively shifted, in accordance with an embodiment of the invention.
Figure 7E:
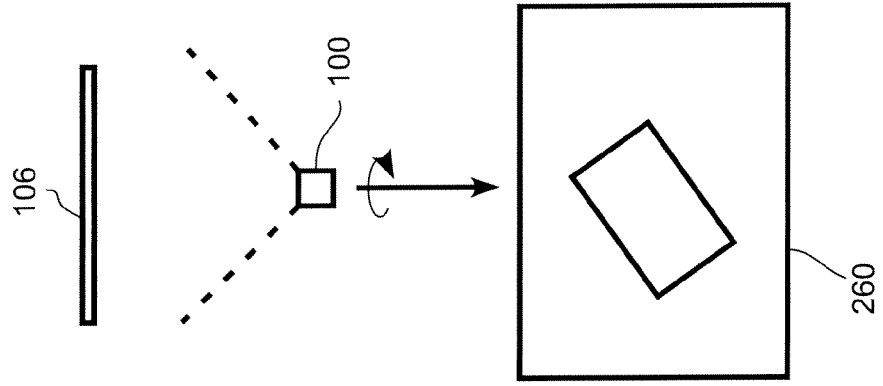
FIG. 7E illustrates an overhead view of a controller, wherein the roll of the controller has been positively adjusted, in accordance with an embodiment of the invention.
Figure 7D:
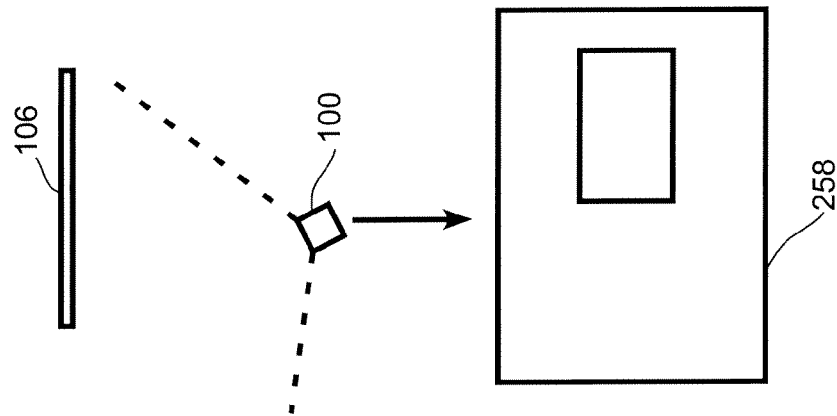
FIG. 7D illustrates an overhead view of a controller, wherein the yaw of the controller has been negatively shifted, in accordance with an embodiment of the invention.

With reference to FIG. 7D, an overhead view of the controller 100 in relation to the display 106 is illustrated, wherein the yaw of the controller 100 has been changed in comparison to that of FIG. 7A. Specifically, the yaw of the controller 100 has been negatively shifted (shifted to towards the left) relative to the display 106. The result is that in the captured image 258, the display appears shifted towards the right side of the image. Moreover, the display exhibits some perspective distortion wherein the left side of the display appears shorter than the right side.

With reference to FIG. 7E, an overhead view of the controller 100 in relation to the display 106 is illustrated, wherein the roll of the controller 100 has been changed in comparison to that of FIG. 7A. Specifically, the roll of the controller 100 has been positively adjusted (clockwise rotation) relative to the display 106. The result is that in the captured image 260, the display appears to be tilted in a counterclockwise fashion.

With reference to FIG. 7F, a side view of the controller 100 in relation to the display 106 is illustrated, wherein the pitch of the controller 100 has been changed in comparison to that of FIG. 7A. Specifically, the pitch of the controller 100 has been positively shifted (shifted upwards) relative to the display 106. The result is that in the captured image 262, the display appears shifted towards the bottom of the image. Moreover, the display exhibits some perspective distortion wherein the top side of the display appears shorter than the bottom side.

As can be seen from the foregoing embodiments, the position and orientation of the controller 100 relative to the display 106 can be determined by capturing and analyzing RGB images of the display captured by the RGB camera 226 at the controller 100. The appearance of the display 106 within the captured RGB images will change in accordance with changes in the position, yaw, pitch, and roll of the controller 100 relative to the display 106.

In various embodiments of the invention, the appearance of the display 106 as captured by the RGB camera 226 is tracked by specifically tracking the outer frame of the display 106. The outer frame of many displays is generally of a uniform color (often a dark color such as black or gray) which is conducive to tracking. Additionally, many displays may have a small outer boundary of the display area which is not illuminated, which may also be tracked. Furthermore, the display may include characteristic design items such as a logo or light indicating that the display is operating which remain stationary and uniform during operation. These design items may provide additional features which can be tracked for the purpose of determining the position and movement of a controller.

Figure 8A:
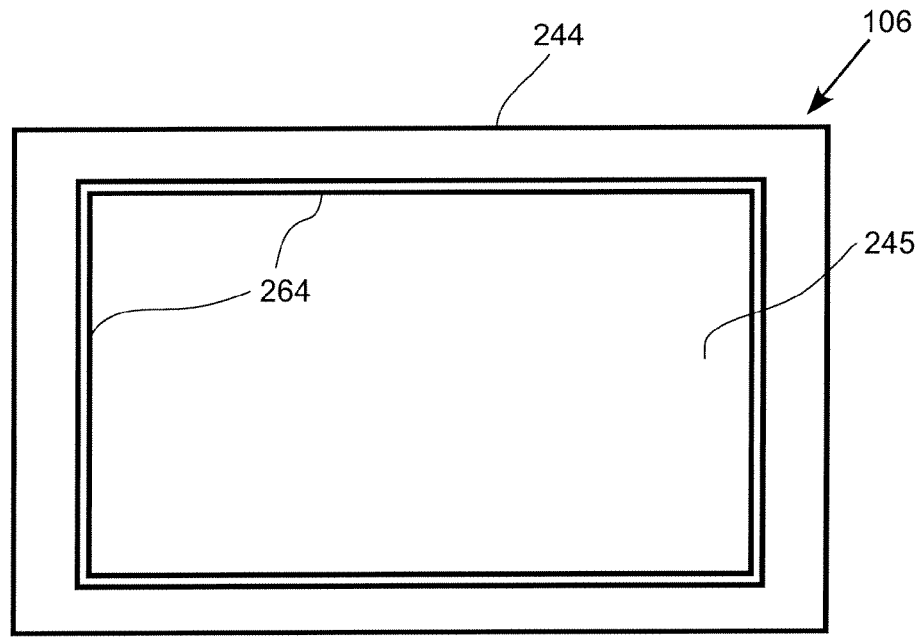
FIG. 8A illustrates a display, wherein a series of tracking bars are rendered at the borders of the screen of the display, in accordance with an embodiment of the invention.

With reference to FIG. 8A, a display 106 is shown, wherein a series of tracking bars 264 are shown at the borders of the screen 245 of the display 106. In accordance with an embodiment of the invention, the tracking bars 264 are tracked in RGB images of the display taken by the RGB camera 226 on the controller 100. By tracking the bars 264 from the controller 100, and analyzing images of the display to determine perspective distortion, location, and orientation of the tracking bars, so the position, orientation, and movement of the controller 100 is determined. In some instances, the outer frame of a display may not be readily ascertainable, such as when a projector is utilized to project an image onto a wall or a projection screen. Therefore, it may be desirable to generate a border which can be tracked such as the thin bars 264.

The tracking bars 264 may be in the form of thin lines having a thickness determined based on a trade-off between accuracy of detection and visual impact. Thicker lines may promote better detection and tracking of the display, but negatively impact the visual display. Whereas thinner lines will improve visual appearance but may be more difficult to track because of their diminished appearance.

In various embodiments, the colors or shades of the tracking bars 264 may be different from one another so as to reduce the visual impact of the bars. Moreover, the colors of the tracking bars may be altered in real-time depending on the colors of the video content being displayed on the display 106, so as to reduce the visual impact of the tracking bars 264 relative to the video content. In order not to negatively impact the detection of the tracking bars at the controller, the controller may be updated real-time with information about the current color of the tracking bars. In one embodiment, the controller includes a color table which contains colors correlated to the colors that the tracking bars 264 may exhibit. In captured images of the display at the controller, the captured images may be evaluated for the presence of the colors and shape of the tracking bars, thereby facilitating determination of the controller's position and movement.

In one embodiment, in order to create a more natural look, the tracking bars form a rectangular color frame, within which the video image is displayed. The rectangular color frame may be grey scale or black, so as to minimize its visual impact.

Figure 8B:
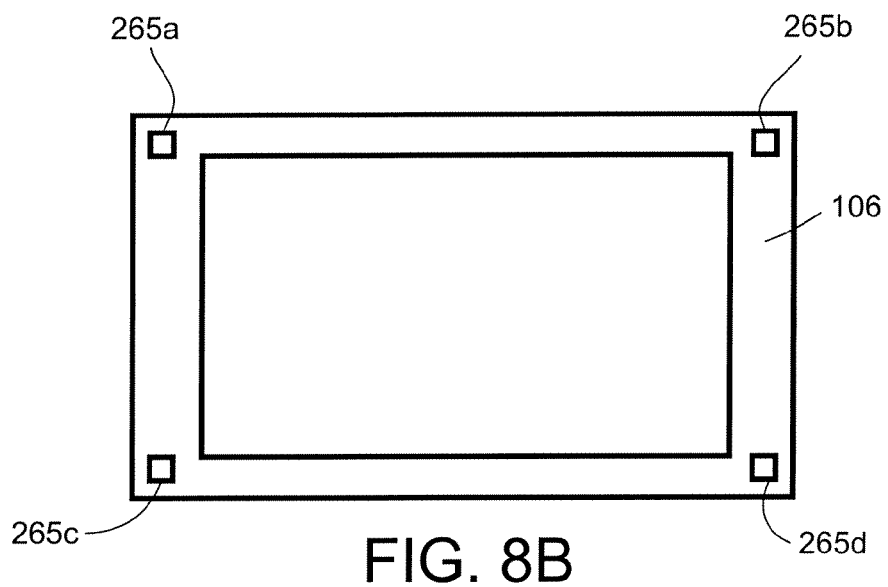
FIG. 8B illustrates a display, wherein reflective stickers are attached to the corners, in accordance with an embodiment of the invention.

In other embodiments of the invention, the outer frame of a display may be altered so as to aid in its detection for purposes of tracking a controller. For example, with reference to FIG. 8B, a display 106 is shown having reflective stickers 265a, 265b, 265c, and 265d attached to the corners of the display 106. The reflective stickers 265a-265d provide areas of the outer frame which may be tracked in RGB images of the display captured by the controller's RGB camera. To further enhance the ability to track the reflective stickers 265a-265d, they may have specific patterns or colors, and be designed to contrast with the color of the display's outer frame 244. The reflective stickers may have different patterns or colors from each other so as to indicate the corner of the display to which they are attached.

The controller 100 is intended to be maneuvered so as to enable a user to interface with an interactive program. As the positional tracking of the controller is dependent upon the controller 100 being able to detect the display 106, it is desirable for the RGB camera of the controller 100 to have as wide a field of view as possible. In various embodiments, this may be accomplished by the inclusion of multiple RGB cameras, and a fish-eye lens.

Figure 9A:
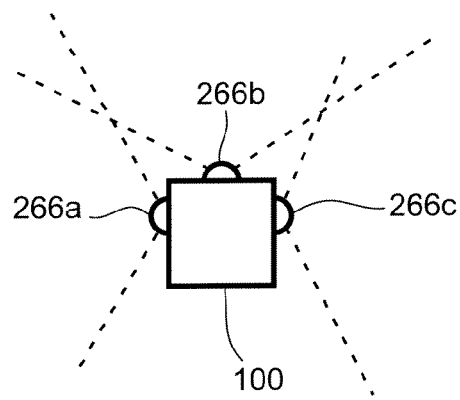
FIG. 9A illustrates a controller having multiple RGB cameras with overlapping fields of view, in accordance with an embodiment of the invention.

With reference to FIG. 9A, a controller 100 is shown in accordance with an embodiment of the invention. The controller 100 as shown includes RGB cameras 266a, 266b, and 266c. The field of view of RGB camera 266a overlaps with the field of view of RGB camera 266b, and the field of view of RGB camera 266b overlaps with that of RGB camera 266c. By combining the fields of view from the multiple RGB cameras 266a-266c, the total field of view available for use by the controller 100 for RGB image capture is in the range of 270 degrees. While the RGB cameras 266a-266c as shown are aligned in substantially the same plane, additional cameras may be placed so as to be aligned in planes intersecting or transverse to that shown in FIG. 9A.

Figure 9B:
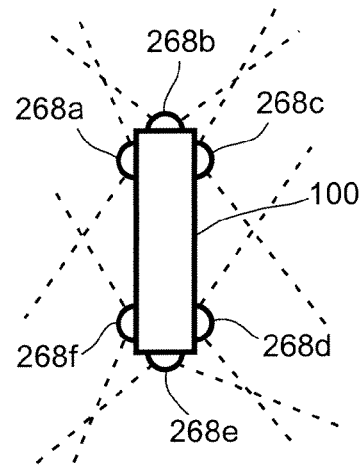
FIG. 9B illustrates a controller having multiple RGB cameras with overlapping fields of view, in accordance with an embodiment of the invention.

With reference to FIG. 9B, a controller 100 having a 360 degree field of view is shown, in accordance with an embodiment of the invention. The controller 100 as shown includes multiple RGB cameras 268a, 268b, 268c, 268d, 268e, and 268f. The fields of view of each of these cameras overlaps with the fields of view of two of the other RGB cameras, so as to collectively form a 360 degree field of view.

Figure 10A:
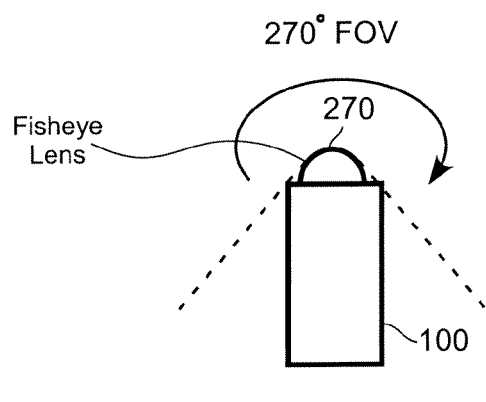
FIG. 10A illustrates a controller having an RGB camera with a fisheye lens, in accordance with an embodiment of the invention.

With reference to FIG. 10A, a controller 100 having an RGB camera 270 which includes a fisheye lens is shown. A fisheye lens provides extremely wide viewing angles, potentially in the range of approximately 270 degrees. Thus, the use of a fisheye lens enables a very wide field of view to be captured by the RGB camera 270. As is known in the art, fisheye lenses produce a fair amount of distortion in order to capture such a wide field of view onto a planar space such as an image sensor. Therefore, in embodiments of the invention which incorporate a fisheye lens into an RGB camera, the analysis of the RGB images captured by the RGB camera takes into account the distortion inherent in images produced using a fisheye lens.

Figure 10B:
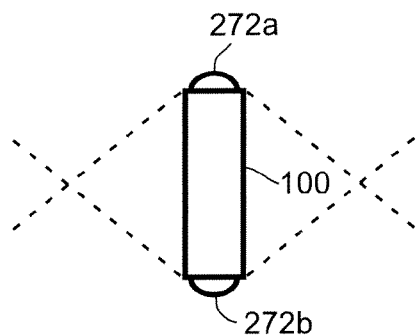
FIG. 10B illustrates a controller having multiple RGB cameras with fisheye lenses, in accordance with an embodiment of the invention.

With reference to FIG. 10B, a controller 100 is shown having two RGB cameras 272a and 272b, each of which incorporates fisheye lenses. The cameras 272a and 272b are pointed in opposite directions. The fields of view of the cameras 272a and 272b overlap so as to provide a 360 degree field of view for the controller 100.

In various embodiments of the invention, the IR functionality of the controller 100 may be combined with the RGB image capture during real-time tracking of the controller 100. For example, in one embodiment, the continuous tracking of the display via the RGB camera is utilized as the primary method of determining the position and movement of the controller. However, when the position of the controller cannot be obtained by this method, such as when the controller is moved so that the display is no longer in the field of view of the RGB camera, then the IR projector and IR camera may be initiated to enable determination of relative motion and orientation.

Figure 11:
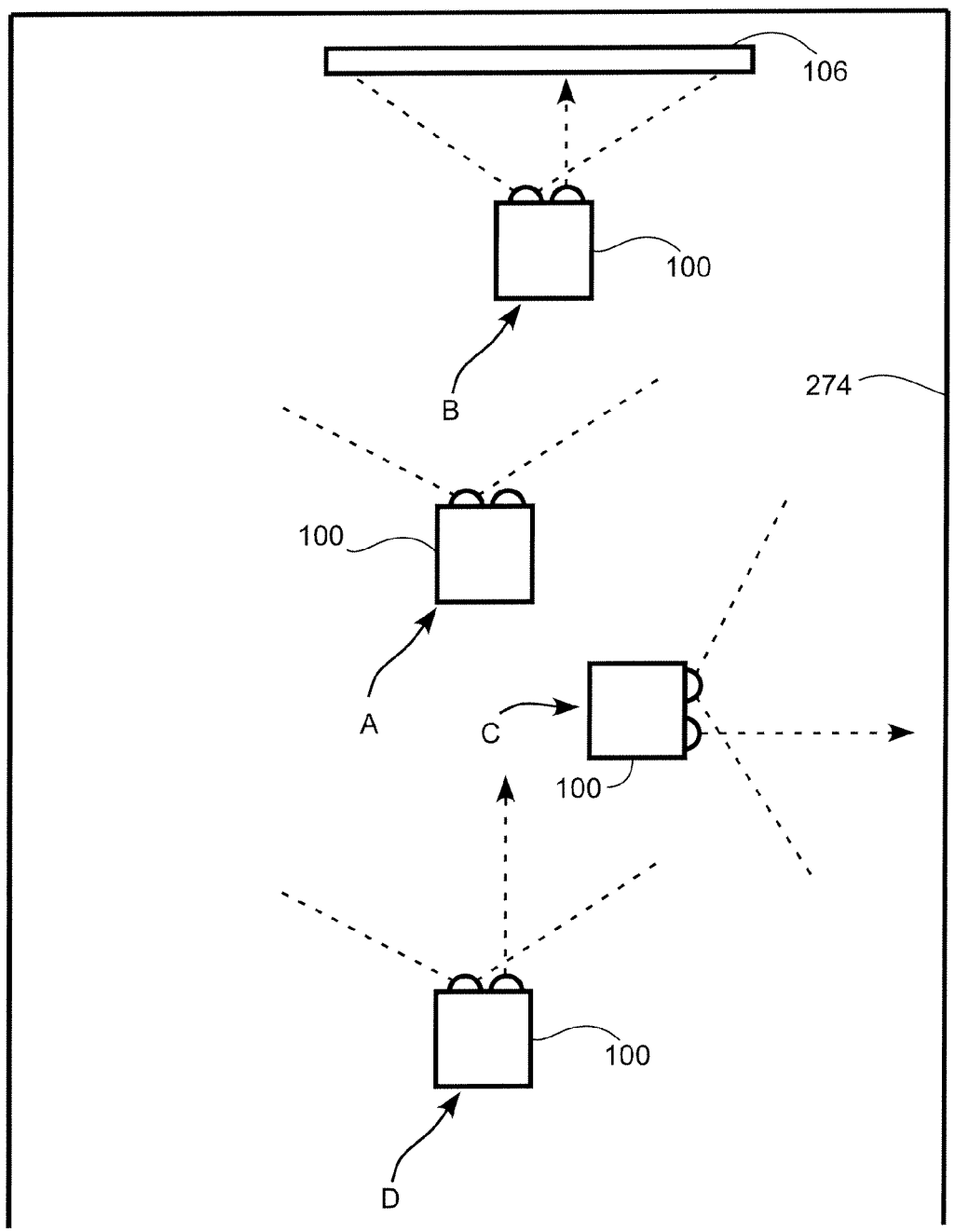
FIG. 11 illustrates the functionality of a controller at various positions and orientations, in accordance with an embodiment of the invention.

As shown at FIG. 11, a controller 100 located at position A is oriented facing the display 106 such that the display 106 appears in the field of view of its RGB camera. The position, movement and orientation of the controller 100 may thus be determined by tracking the display 106 in captured RGB images of the display. However, when the controller 100 is moved to position B, the controller is now so close to the display 106 that the outer borders of the display are no longer in the field of view of the RGB camera. As such, the position of the controller 100 cannot be determined based on analysis of the captured images of the RGB camera. In order to continue tracking of the position and orientation of the controller 100, the IR projector and IR camera of the controller 100 are turned on. In accordance with the principles discussed above, the IR projector generates a projection which is captured by the IR camera as a series of IR images. Since the controller 100 at position B is so close to the display 106, the projection is likely on the surface of the display 106 itself, though it may be on another surface such as a wall. Analysis of the captured IR images of the IR camera yields the controller's distance from the projection surface and the orientation of the controller despite the loss of the ability to determine position based on RGB images. In particular, the orientation can be determined by utilizing the last known orientation of the controller according to RGB image analysis and thereafter initiating the IR functionality and continuously tracking the changes in the IR projection.

A similar situation occurs when the controller 100 is moved to a position C, wherein the controller 100 is oriented in the direction of sidewall 274, such that the display 106 is outside the field of view of the controller's RGB camera. Because the display 106 is outside the field of view of the controller's RGB camera, the IR projector and IR camera are initiated to enable determination of position and orientation of the controller while it is directed away from the display 106.

Additionally, the IR functionality of the controller 100 may be useful as a supplement to the RGB image-based position/orientation determination when better tracking of the controller is desired. For example, with continued reference to FIG. 11, when the controller 100 is moved away from the display 106, such as at position D, the display 106 may appear rather small in the field of view of the controller's RGB camera. As such, tracking the display may become more difficult, and the system may be prone to less robust tracking of the display. Therefore, the IR-based tracking mechanism is initiated to supplement the RGB image tracking mechanism for improved tracking of the controller, and as a redundant system in case the position/orientation of the controller becomes non-ascertainable based on RGB image analysis alone.

When the controller is moved so as to cause the display 106 to move out of the field of view of the controller's RGB camera, the shift of the display in the field of view of the RGB camera occurs over time. At first, one or two corners of the display will be lost from the field of view, followed by the remaining corners of the display. Because the orientation of the display in the field of view is known before the corners are lost from view, and because the dimensions of the display are known, it is possible to continue to determine the position of the controller even while only two corners of the display remain in the field of view of the RGB camera. However, since the loss of controller position determination based on RGB images is imminent at this point, it may be desirable to turn on the IR projector and IR camera before more than two corners of the display are lost from the RGB camera's field of view.

Figure 12C:
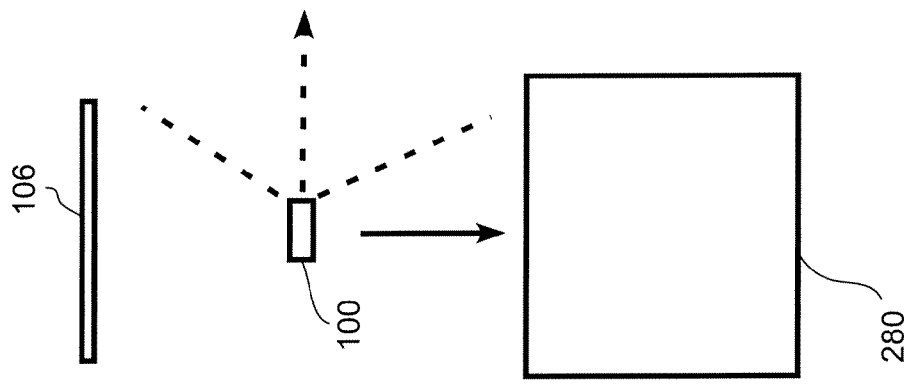
FIG. 12C illustrates a controller directed away from a display, in accordance with an embodiment of the invention.
Figure 12B:
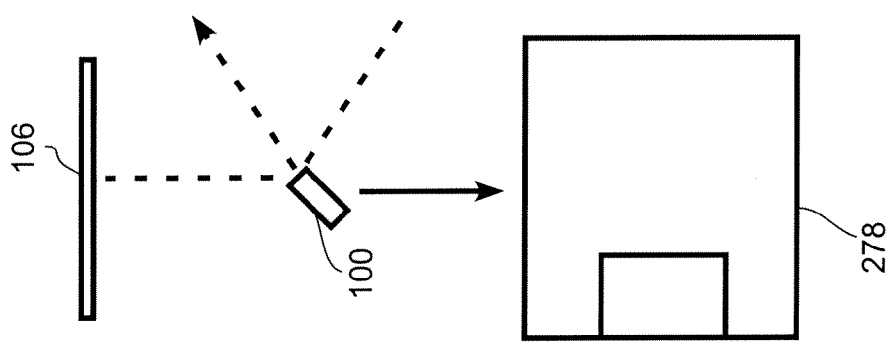
FIG. 12B illustrates a controller being turned away from a display, such that IR functionality of the controller is initiated, in accordance with an embodiment of the invention.
Figure 12A:
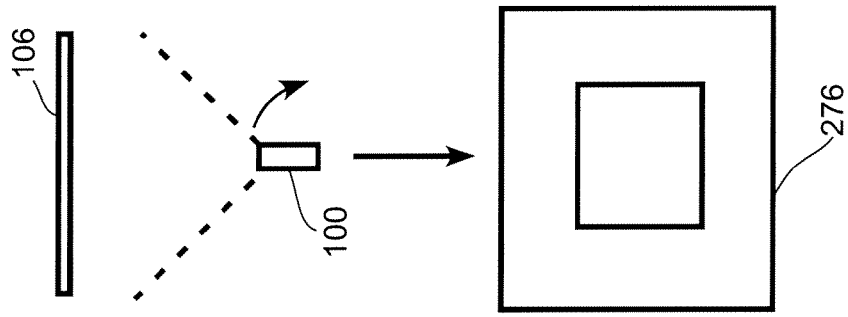
FIG. 12A illustrates a controller directed towards a display, in accordance with an embodiment of the invention.

With reference to FIGS. 12A, 12B, and 12C, an overhead view of a controller 100 is shown as it is maneuvered away from a display 106. At FIG. 12A, the controller is facing the display 106, such that the display 106 is fully within the field of view of the controller's RGB camera. This may be seen in a captured RGB image 276 of the RGB camera, wherein the entirety of the display is visible in the RGB image 276. At FIG. 12B, the controller 100 has been turned towards the side, such that only the two right corners of the display are now visible in the RGB captured image 278. Because the dimensions of the display 106 are known, and its orientation was known before movement of the display out of the RGB camera's field of view, it is still possible to determine the position and orientation of the controller even when only two corners of the display are in the field of view. However, loss of the entirety of the display from the field of view is imminent, and so the IR functionality of the controller 100 is initiated in anticipation of this occurring. In this manner, the transition from the RGB image based mechanism to the IR mechanism is smoothed. At FIG. 12C, the controller 100 is oriented such that the display 106 is completely outside the field of view of the controller's RGB camera, and does not appear in a captured image 280 of the RGB camera. At this point, the system relies upon the IR projector and IR camera of the controller to determine position and orientation of the controller 100.

Figure 13:
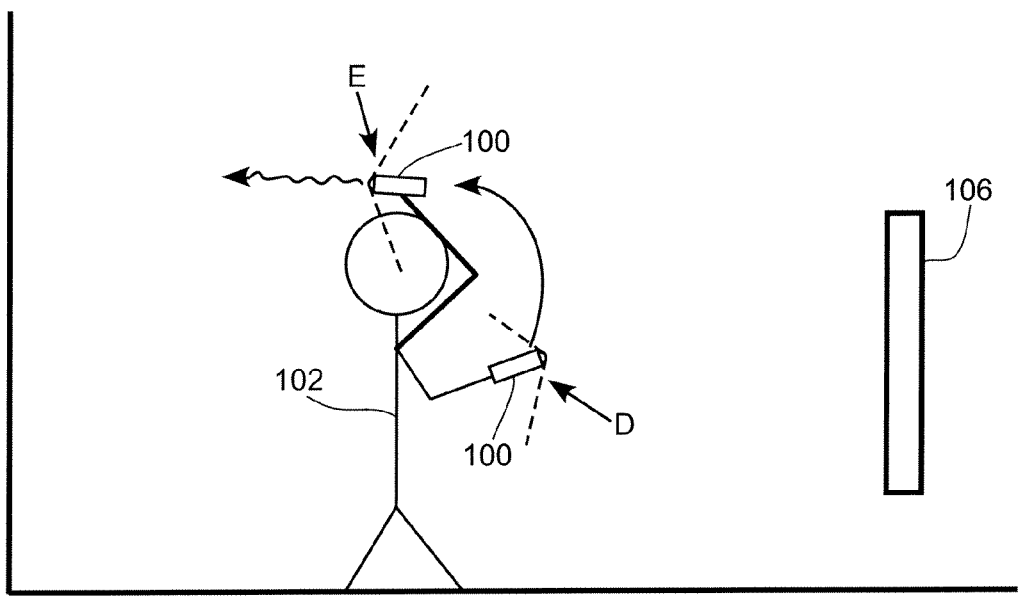
FIG. 13 illustrates a user holding a controller in various positions and orientations, in accordance with an embodiment of the invention.

With reference to FIG. 13, a user 102 holding a controller 100 is shown, in accordance with an embodiment of the invention. When the user 102 holds the controller at position D, the controller 100 is approximately directed towards the display 106 such that the display appears in the field of view of the controller's RGB camera. However, when the user moves the controller to position E, the controller 100 is directed away from the display 106. Thus, an IR projector and IR camera of the controller 100 are initiated and utilized to determine the position and orientation of the controller 100.

Figure 14:
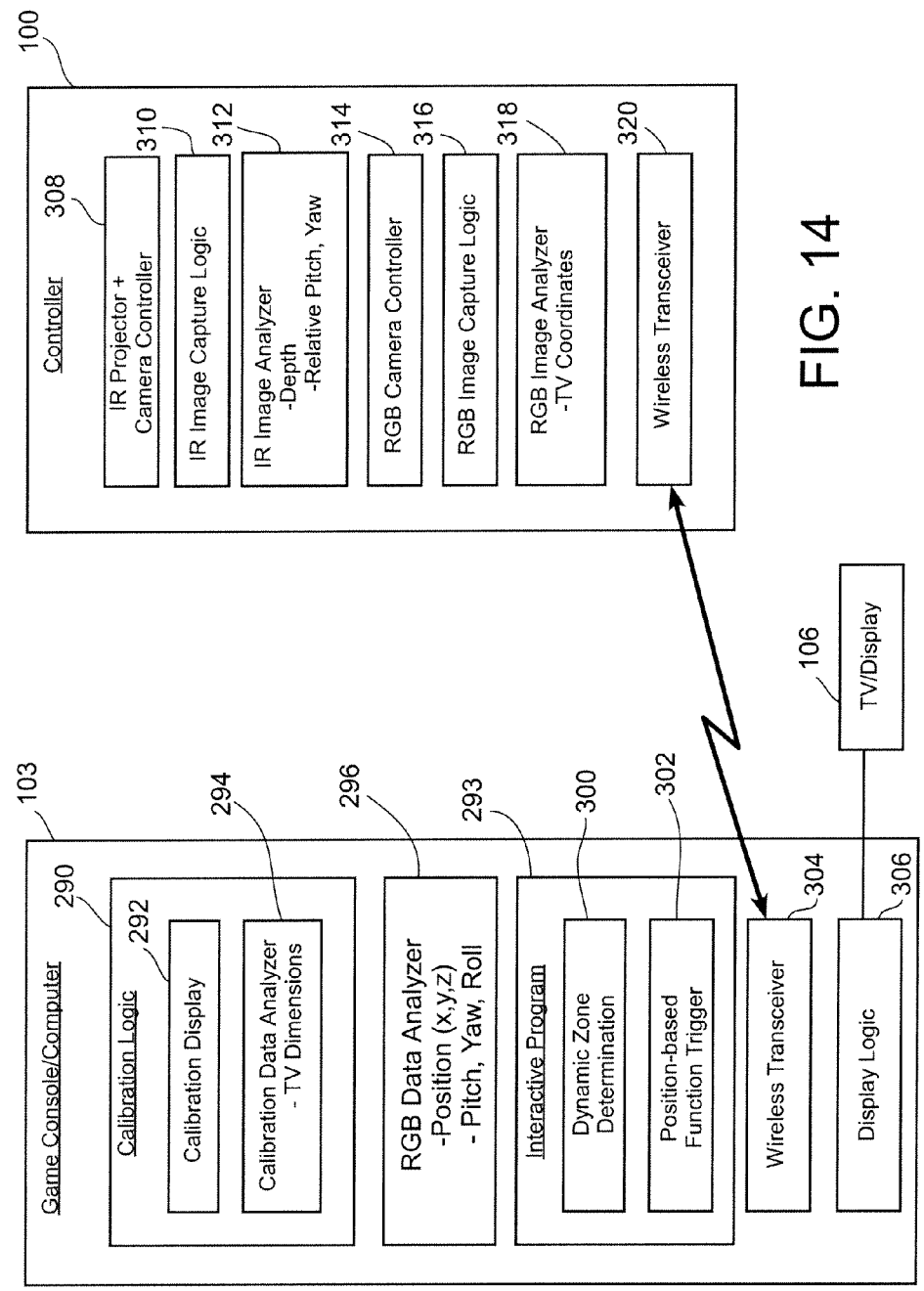
FIG. 14 illustrates a schematic diagram of a system for providing controller input to an interactive program, in accordance with an embodiment of the invention.

With reference to FIG. 14, a logical diagram illustrating a system for providing controller input to an interactive program is shown. The computer 103 executes an interactive program 298 which can receive interactive input from the controller 100. The interactive program is displayed to a user via display logic 306, which sends video data to the display 106 for rendering. The controller 100 includes a wireless transceiver 320 for facilitating wireless communications with a computer 103, which also includes a wireless transceiver 304. The controller 100 includes an IR projector and IR camera controller 308, which controls the on/off state of the IR projector and IR camera of the controller in accordance with commands received from the computer 103. For example, the IR projector and IR camera may be turned on for initialization purposes in order to determine the dimensions of the display 106. Or the IR projector and IR camera may be turned on when the display 106 is outside or nearly outside the field of view of the RGB camera of the controller 100. The IR projector and IR camera may also be triggered on when better tracking of the controller 100 is desired, even when the display 106 is within the field of view of the RGB camera, such as when the controller 100 is located at a large distance from the display 106.

IR image capture logic 310 controls the IR image capture by the IR camera, providing a continuous stream of IR images at a regular frame rate such as 60 frames per second. In various embodiments, the frame rate of the IR image stream may be higher than 60 frames per second (e.g. 120 fps) or lower than 60 frames per second. An IR image analyzer 312 is included for analyzing the stream of captured IR images. As described above, the IR camera is directed so as to capture images of the IR projection generated by the IR projector. Thus, the IR image analyzer 312 determines the shape, size, and orientation of the IR projection in the captured IR images. Based on this analysis, the distance from the projection surface, and the relative pitch and yaw (or relative roll) of the controller 100 is determined.

The controller 100 additionally includes an RGB camera controller which controls the on/off state of the controller's RGB camera. RGB image capture logic 316 is provided for controlling the RGB image capture of the controller's RGB camera, providing a continuous stream of RGB images at a regular frame rate such as 60 frames per second. In various embodiments, the frame rate of the RGB camera may be greater than or less than 60 frames per second. A higher frame rate (e.g. 120 fps) yields greater fidelity for purposes of position and orientation determination. An RGB image analyzer 318 performs an initial processing of the captured RGB image frames. In one embodiment, the RGB image analyzer determines the location and shape of the display within the captured RGB images. In one embodiment, this data is reduced to coordinates within the space of the RGB images which describe the outline of the display. These coordinates are sent to the computer 103 for further processing, as the determination of the position/orientation of the controller references the dimensions of the display 106. In another embodiment, the RGB image analyzer performs a hash or compression of the captured RGB images. The compressed RGB images are sent to the computer 103 for analysis to determine the location and shape of the display in the images.

The computer 103 includes an RGB data analyzer 296, which analyzes data regarding the captured RGB images from the controller 100. More specifically, the location, shape, size, and orientation of the display within the captured RGB images is determined with reference to the actual dimensions of the display 106. As such, the position and orientation of the controller 100 is determined by the RGB data analyzer 296 based on the perspective distortion and orientation of the display within the captured images, and by reference to the actual dimensions of the display. The position is determined in 3-D space relative to the display 106, and the orientation of the controller 100 is determined in terms of pitch, yaw, and roll.

While the illustrated embodiment contemplates processing of the RGB data analyzer 296 at the computer 103, in another embodiment, the functions of the RGB data analyzer 296 are carried out at the controller 100. The controller 100 may include DSP hardware and memory which are required to enable processing of image data as well as final determination of the controller's position and orientation. The controller 100 thus may be configured to output to the computer 103 its location relative to the display 106.

The computer 103 includes calibration logic 290 for calibrating the controller by determining the dimensions of the display 106. A calibration display unit 292 causes the computer 103 to output to the display 106 a blank image, or an image with a specific color or pattern for calibration purposes. For example, in accordance with the above-described methods of calibration, the display may be black or darkened, or may include colored bars and the like which highlight the outer frame and corners of the display 106. A calibration data analyzer 294 determines the dimensions of the display 106 based on data received from the controller 100. The data received from the controller 100 may include IR-based distance/orientation information of the controller 100, and an RGB image including the display as captured by the controller's RGB camera. Based on such data received from the controller 100, the calibration data analyzer determines the dimensions of the display 106.

An interactive program 298 runs on the computer 103. In accordance with an embodiment of the invention, the interactive program 298 includes dynamic zone determination 300, which, based on the operation of the interactive program, determines three dimensional zones which affect the functionality of the controller 100. Position-based function trigger 302 determines the function to be executed by the interactive program based on received input from the controller, and the controller's position relative to the zones determined by the dynamic zone determination 300.

The above-described system of FIG. 14 constitutes means for determining position/orientation/movement of the controller 100. Means for initializing the computer-based system to establish a starting position of the controller device relative to the display are provided by the calibration logic 290. Means for capturing an image of the display using a camera integrated in the controller device are provided by the RGB camera controller 314. Means for capturing an image of a radiation pattern projected by the controller device are provided by the IR camera controller 308. Means for analyzing the captured image of the display and the image of the radiation pattern projected by the controller device to determine a size of the display in the captured image at a distance of the controller device as determined by the image of the projected radiation pattern are provided by the calibration data analyzer 294. Means for capturing successive images of the display at the controller device are provided by the RGB camera controller 314. Means for determining a position of the controller device relative to the display based on a perspective distortion of the display in the captured successive images of the display are provided by the RGB image analyzer 318 and the RGB data analyzer 296. Means for providing the determined position of the controller to the computer-based system to interface with the interactive program to cause an action by the interactive program are provided by the RGB data analyzer 296 as it provides data to interactive program 298. Means for determining an orientation of the controller device based on a location and orientation of the display in the captured image of the display are provided by the RGB data analyzer 296. Means for determining movement of the controller device by tracking the position of the controller at the time of each captured successive image are provided by the RGB image analyzer 318 and the RGB data analyzer 296. Means for determining position of claim 17, wherein the radiation pattern projected by the controller is generated by an IR projector.

Means for auxiliary position determination are provided by the IR projector and camera controller 308, the IR image capture logic 310, and the IR image analyzer 312. The means for auxiliary position determination are configured to perform the following operations when the position of the controller device cannot be determined based on the captured successive images of the display: (1) project the radiation pattern from the controller device; (2) capture successive images of the radiation pattern at the controller device; and (3) estimate the position of the controller device based on the captured successive images of the radiation pattern.

In various embodiments, it is not necessary to capture images of the entirety of the display, so long a portion of the display sufficient to enable functionality of the controller is captured. Therefore, in one embodiment, the means for determining position is configured so that the capturing an image of the display includes capturing an image of a portion of the display sufficient to enable determination of the size of the display. In one embodiment, the means for determining position is configured so that the capturing successive images of the display includes capturing successive images of a portion of the display sufficient to enable determination of the position of the controller device.

Figure 15:
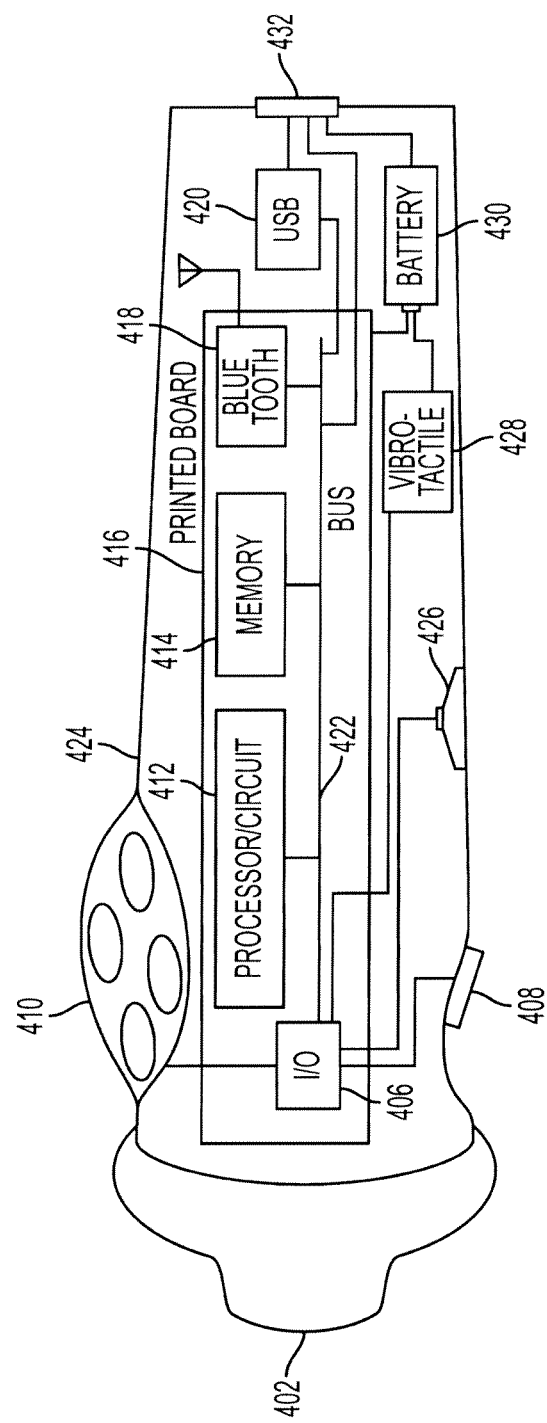
FIG. 15 illustrates the components of a handle of a controller with an expansion connector, in accordance with an embodiment of the invention.

In one embodiment, the controller 100 may consist of a handle and a separate attachment which provides expanded capabilities. FIG. 15 illustrates the components of a handle 424 of a controller with expansion connector 402, in accordance with an embodiment of the invention. Although controllers defined within the spirit and scope of the claims may have more or less components, these exemplary components show example electronics, hardware, firmware, and housing structure to define an operable example. These example components, however, should not limit the claimed inventions, as more or fewer components are possible. Handle 424 is configured to be held by a user operating controller 100 with a single hand. A user's second hand may, of course, be used to hold or select buttons on handle 424. A user holding controller 100 can provide input by pressing buttons, such as top button 410 and bottom button 408. In one embodiment input can also be provided by moving the controller within a three-dimensional space when an attachment is coupled to handle 424, such as the one shown in FIG. 17A. Controller 100 is configured to operate wirelessly, which facilitates freedom of controller movement in order to interact with the computer 103. Wireless communication can be achieved in multiple ways, such as via Bluetooth® wireless link, WiFi, infrared (not shown) link, etc.

Attachments providing expanded capabilities to handle 424 are connected and disconnected to expansion connector 402. In one embodiment, an attachment enables the base computing device to locate the combination of handle and attachment within a three-dimensional space via visual recognition of images taken by a camera within the attachment itself. More specifically, and as explained previously, the location of the combined handle and attachment is determined from images taken at the controller 100 based on perspective distortion and orientation of the display 106 in the captured images. Other embodiments provide additional communication capabilities to controller 100, such as an attachment that provides ultrasonic communication with the computer 103 or with other controllers in the field of play. In yet another embodiment, an attachment provides infrared capabilities to allow the controller to communicate via infrared frequencies with the computer, or to use controller 100 as a remote control for a TV or other electronic equipment.

In one embodiment, the attachment communicates directly with the computer and can act upon commands received from the computer, such as turning on an internal light or emitting a sound. In another embodiment, the attachment is directly controlled by handle 424 and the attachment only reacts to commands from handle 424. In yet another embodiment, the attachment can react to commands received from the computer or from the handle.

Inside handle 424, printed circuit board 416 holds processor 412, Input/Output (I/O) module 406, memory 416, and Bluetooth module 418, all interconnected by bus 422. A Universal Serial Bus (USB) module 420 also provides interactivity with the base computing device, or with other devices connected to USB port 432. The USB port can also be used to charge the rechargeable battery 430. Vibrotactile feedback is provided by vibrotactile module 428. Speaker 426 provides audio output.

Note that the above controller configuration is exemplary and many modifications thereto, including eliminating or adding modules, would occur to a person of ordinary skill in the art with access to the present Specification, and is well within the scope of the claimed invention. For example, controller 300 can also include sensors for mechanical tracking of the controller movement.

FIG. 16 depicts a controller 100 with sensors for improving movement tracking, according to one embodiment. Different embodiments include different combinations of sensors, such as magnetometers 434, accelerometers 436, gyroscopes 438, etc. An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 436 are used to provide the direction of gravity, which gives an absolute reference for 2 angles (world-space pitch and world-space roll). Controllers can suffer accelerations exceeding 5 g, therefore accelerometers able to operate with forces exceeding 5 g are used inside controller 100.

A magnetometer measures the strength and direction of the magnetic field in the vicinity of the controller. In one embodiment, three magnetometers 434 are used within the controller, ensuring an absolute reference for the world-space yaw angle. The magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from the gyros (see below) or the camera. In one embodiment, accelerometer 436 is used together with magnetometer 434 to obtain the inclination and azimuth of the controller.

A gyroscope is a device for measuring or maintaining orientation, based on the principles of angular momentum. In one embodiment, three gyroscopes provide information about movement across the respective axis (x, y and z) based on inertial sensing. The gyroscopes help in detecting fast rotations. However, the gyroscopes can drift overtime without the existence of an absolute reference. This requires, resetting the gyroscopes periodically, which can be done using other available information, such as positional/orientation determination based on visual tracking of the display 106, accelerometer, magnetometer, etc. A hand-held device can rotate faster than 500 degrees/sec, so a gyroscope with a spec of more than 1000 degrees/sec is recommended, but smaller values are also possible.

The information from the different sources can be combined for improved location and orientation detection. For example, if the controller is moved or oriented such that the display is no longer in the field of view of the RGB camera, then the accelerometer's orientation sensing is used to detect that the controller is facing away from the display. In one embodiment, controller 100 includes speaker 426 to provide audio feedback to the player. The controller can produce a beep when the display is not in the RGB camera's field of view, prompting the player to orientate the controller in the right direction or to come back into the field of play.

Figure 17A:
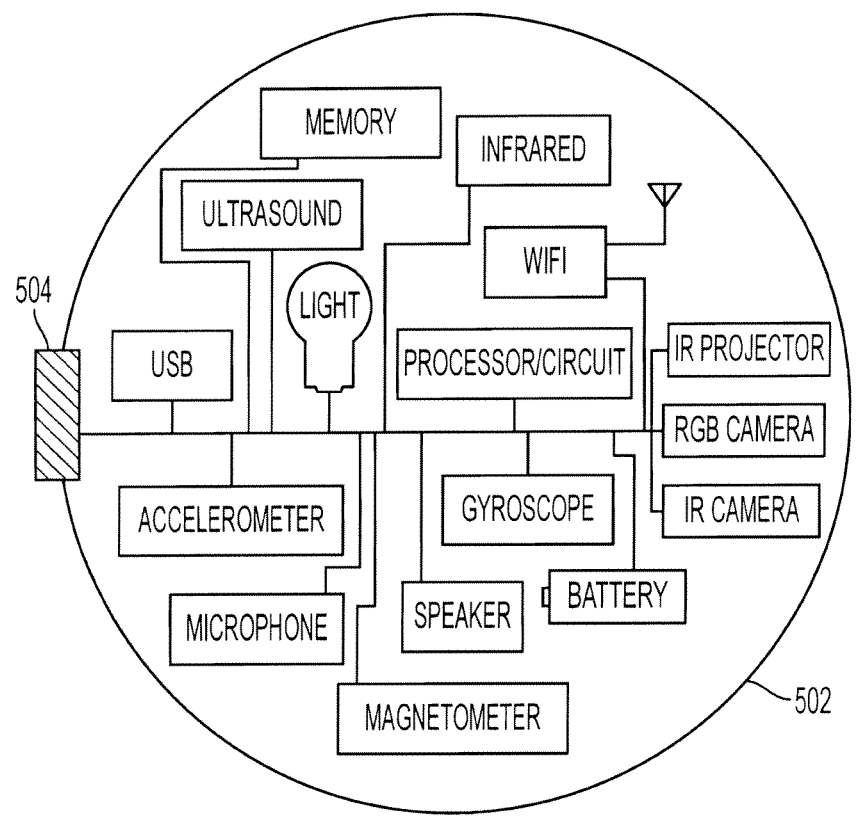
FIG. 17A depicts an attachment for the handle of a controller, in accordance with an embodiment of the invention.

FIG. 17A depicts an attachment 502 for the handle 424 with a "rich" feature set. It should be appreciated that the embodiment illustrated in FIG. 17A is exemplary and other embodiments may include a subset of the features of attachment 502. The embodiment illustrated in FIG. 17A should therefore not be interpreted to be exclusive or limiting, but rather exemplary or illustrative.

The different modules in spherical attachment 502 are interconnected via a common bus, but other interconnection mechanisms are possible. Connector 504 provides the interface to connect or disconnect attachment 502 from the controller. Attachment 502 includes a processor or circuit plus memory allowing the attachment to process computer instructions. Further, attachment 502 includes communication modules such as ultrasound, infrared, and WiFi. Such communications enable the attachment to communicate with the computer or other electronic devices, which is referred to herein as a communications interface between the controller and the computer or any other electronic device. In one embodiment, the attachment operates as a modem by receiving information from the controller and forwarding the information to the computer, and vice versa.

Information received by the attachment and passed to the controller is used to change the state of the controller. For example, the controller may emit a sound, change button configuration, disable the controller, load registers in memory, send a command to the attachment to light up, etc. The information received by the computer is used by the interactive program to update the state of the interactive program. For example, the interactive program may move an avatar on the screen or change the status of the avatar, fire a weapon, start a game, select an option in a menu, etc.

An accelerometer, a magnetometer and a gyroscope provide mechanical information related to the movement of the attachment. In one embodiment, the mechanical or inertial information is combined with other location determination information, such as visual tracking of the display, in order to refine the determination of the location of the controller-attachment combo.

An internal light emitting device allows the attachment to be lit from the inside to provide user feedback. In one embodiment, light emitting device can emit light of a single color, and in another embodiment, light emitting device can be configured to emit light from a choice of colors. In yet another embodiment, attachment 502 includes several light emitting devices, each device being capable of emitting light of one color. The light emitting device is configurable to emit different levels of brightness. The computer can provide interactivity to the user holding the controller by changing the light emitting status of attachment 502, producing audio signals, or with vibrotactile feedback, etc. One feedback operation or a combination of feedback operations is possible. In one embodiment, the type of feedback is selected from a list of predefined interactivity, and based on what is occurring in a game.

A microphone and a speaker provide audio capabilities, while a battery powers the rest of the components, including the processor and the light emitting device. The battery can also be used by the handle as a second source of power. For example, if the rechargeable battery in the controller is discharged, the attachment can provide the required power so the user can continue playing instead of having to stop to recharge the controller. In one embodiment, attachment 502 does not include the battery and power to the modules in attachment 502 is obtained via an electrical connection with the power source of the handle.

An IR projector and an IR camera provide IR functionality for determining relative position and orientation of the controller as described above. An RGB camera captures RGB images of the display so that the position of the controller may be determined based on the perspective distortion and orientation of the display in the captured RGB images.

A USB module allows USB communication to and from the attachment. In one embodiment, the USB connection is used to charge the battery in the attachment. In yet another embodiment, attachment 502 includes files in memory that are transferred to the controller, or to the computer, or to both the controller and the computer. The files in memory can include configuration files or programs that are transferred for execution in the controller or the gaming system. The files can be used to identify a specific user, to configure the controller or the base system, to load a game, to add features to existing games, etc. For example, one file is a game that is loaded to the computer for playing, another file contains karaoke songs that can be used in a sing-along game, another file contains new player rosters and statistics for an update to a sports game, etc. In addition, the attachment can be used to store user parameters, such as player configuration for a particular game. The player can then use the attachment in a different gaming system to play with other players using the configuration obtained from the original gaming system.

Figure 17B:
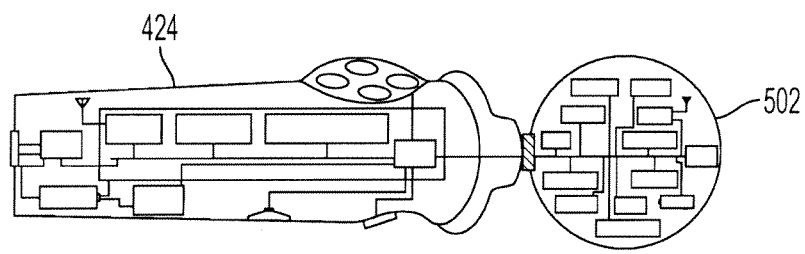
FIG. 17B illustrates an embodiment where the attachment of FIG. 17A is connected to the controller of FIG. 15.

FIG. 17B illustrates an embodiment where the attachment of FIG. 17A is connected to the controller of FIG. 15. In one embodiment, attachment 502 interacts with controller 424 via a communications interface, such as a USB interface. In another embodiment, attachment 502 is in electrical communication with one or several internal modules inside controller 424. For example, processor/circuit of attachment 502 (as seen in FIG. 17A) is connected to bus 422 of controller 424 (as seen in FIG. 15), thus allowing the processor of attachment 502 to communicate with the modules in the controller attached to the bus. The processor of attachment 502 can access memory 416 to write or read data directly, or generate interrupts for processor/circuit 412 of controller 424 to signal an external event which must be processed by processor 412.

It should be noted that the embodiment depicted in FIG. 17B is exemplary and other embodiments may include fewer components.

Figure 18:
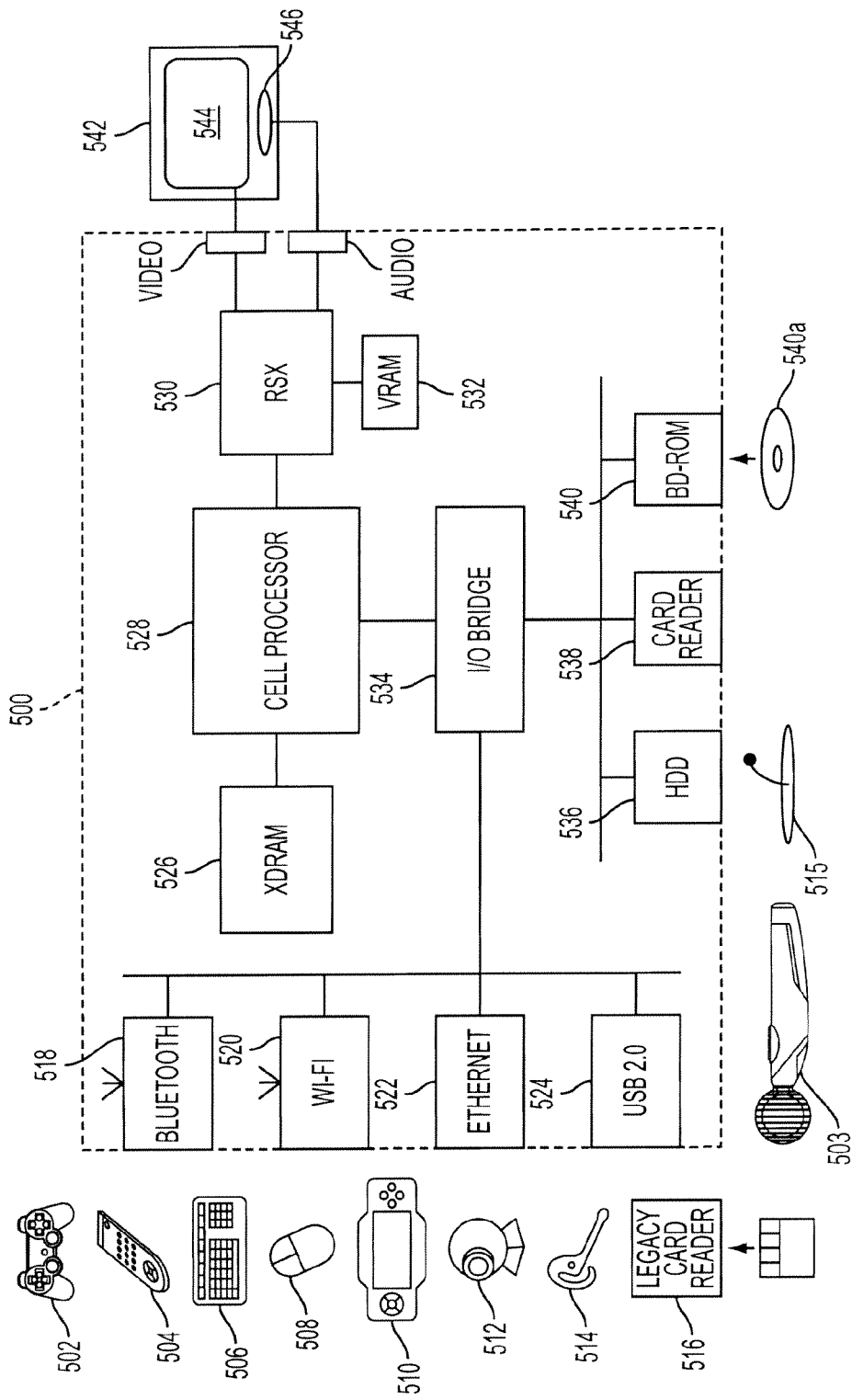
FIG. 18 illustrates hardware and user interfaces that may be used to determine controller location, in accordance with an embodiment of the present invention.

FIG. 18 illustrates hardware and user interfaces that may be used to determine controller location, in accordance with one embodiment of the present invention. FIG. 18 schematically illustrates the overall system architecture of the Sony® Playstation 3® entertainment device, a console that may be compatible for interfacing a control device with a computer program executing at a base computing device in accordance with embodiments of the present invention. A system unit 500 is provided, with various peripheral devices connectable to the system unit 500. The system unit 500 comprises: a Cell processor 528; a Rambus® dynamic random access memory (XDRAM) unit 526; a Reality Synthesizer graphics unit 530 with a dedicated video random access memory (VRAM) unit 532; and an I/O bridge 534. The system unit 500 also comprises a Blu Ray® Disk BD-ROM® optical disk reader 540 for reading from a disk 540*a* and a removable slot-in hard disk drive (HDD) 536, accessible through the I/O bridge 534. Optionally the system unit 500 also comprises a memory card reader 538 for reading compact flash memory cards, Memory Stick® memory cards and the like, which is similarly accessible through the I/O bridge 534.

The I/O bridge 534 also connects to six Universal Serial Bus (USB) 2.0 ports 524; a gigabit Ethernet port 522; an IEEE 802.11b/g wireless network (Wi-Fi) port 520; and a Bluetooth® wireless link port 518 capable of supporting of up to seven Bluetooth connections.

In operation, the I/O bridge 534 handles all wireless, USB and Ethernet data, including data from one or more game controllers 502-503. For example when a user is playing a game, the I/O bridge 534 receives data from the game controller 502-503 via a Bluetooth link and directs it to the Cell processor 528, which updates the current state of the game accordingly.

The wireless, USB and Ethernet ports also provide connectivity for other peripheral devices in addition to game controllers 502-503, such as: a remote control 504; a keyboard 506; a mouse 508; a portable entertainment device 510 such as a Sony Playstation Portable® entertainment device; a video camera such as an EyeToy® video camera 512; a microphone headset 514; and a microphone 515. Such peripheral devices may therefore in principle be connected to the system unit 500 wirelessly; for example the portable entertainment device 510 may communicate via a Wi-Fi ad-hoc connection, whilst the microphone headset 514 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 516 may be connected to the system unit via a USB port 524, enabling the reading of memory cards 548 of the kind used by the Playstation® or Playstation 2® devices.

The game controllers 502-503 are operable to communicate wirelessly with the system unit 500 via the Bluetooth link, or to be connected to a USB port, thereby also providing power by which to charge the battery of the game controllers 502-503. Game controllers 502-503 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape such as the spherical section facing the game console, and wireless communications using protocols such as Bluetooth®, WiFi™, etc.

Game controller 502 is a controller designed to be used with two hands, and game controller 503 is a single-hand controller with an attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 504 is also operable to communicate wirelessly with the system unit 500 via a Bluetooth link. The remote control 504 comprises controls suitable for the operation of the Blu Ray™ Disk BD-ROM reader 540 and for the navigation of disk content.

The Blu Ray™ Disk BD-ROM reader 540 is operable to read CD-ROMs compatible with the Playstation and PlayStation 2 devices, in addition to conventional pre-recorded and recordable CDs, and so-called Super Audio CDs. The reader 540 is also operable to read DVD-ROMs compatible with the Playstation 2 and PlayStation 3 devices, in addition to conventional pre-recorded and recordable DVDs. The reader 540 is further operable to read BD-ROMs compatible with the Playstation 3 device, as well as conventional pre-recorded and recordable Blu-Ray Disks.

The system unit 500 is operable to supply audio and video, either generated or decoded by the Playstation 3 device via the Reality Synthesizer graphics unit 530, through audio and video connectors to a display and sound output device 542 such as a monitor or television set having a display 544 and one or more loudspeakers 546. The audio connectors 550 may include conventional analogue and digital outputs whilst the video connectors 552 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 528. The Playstation 3 device's operating system supports Dolby® 5.1 surround sound, Dolby® Theatre Surround (DTS), and the decoding of 7.1 surround sound from Blu-Ray® disks.

In the present embodiment, the video camera 512 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 500. The camera LED indicator is arranged to illuminate in response to appropriate control data from the system unit 500, for example to signify adverse lighting conditions. Embodiments of the video camera 512 may variously connect to the system unit 500 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 500, an appropriate piece of software such as a device driver should be provided. Device driver technology is well-known and will not be described in detail here, except to say that the skilled man will be aware that a device driver or similar software interface may be required in the present embodiment described.

Figure 19:
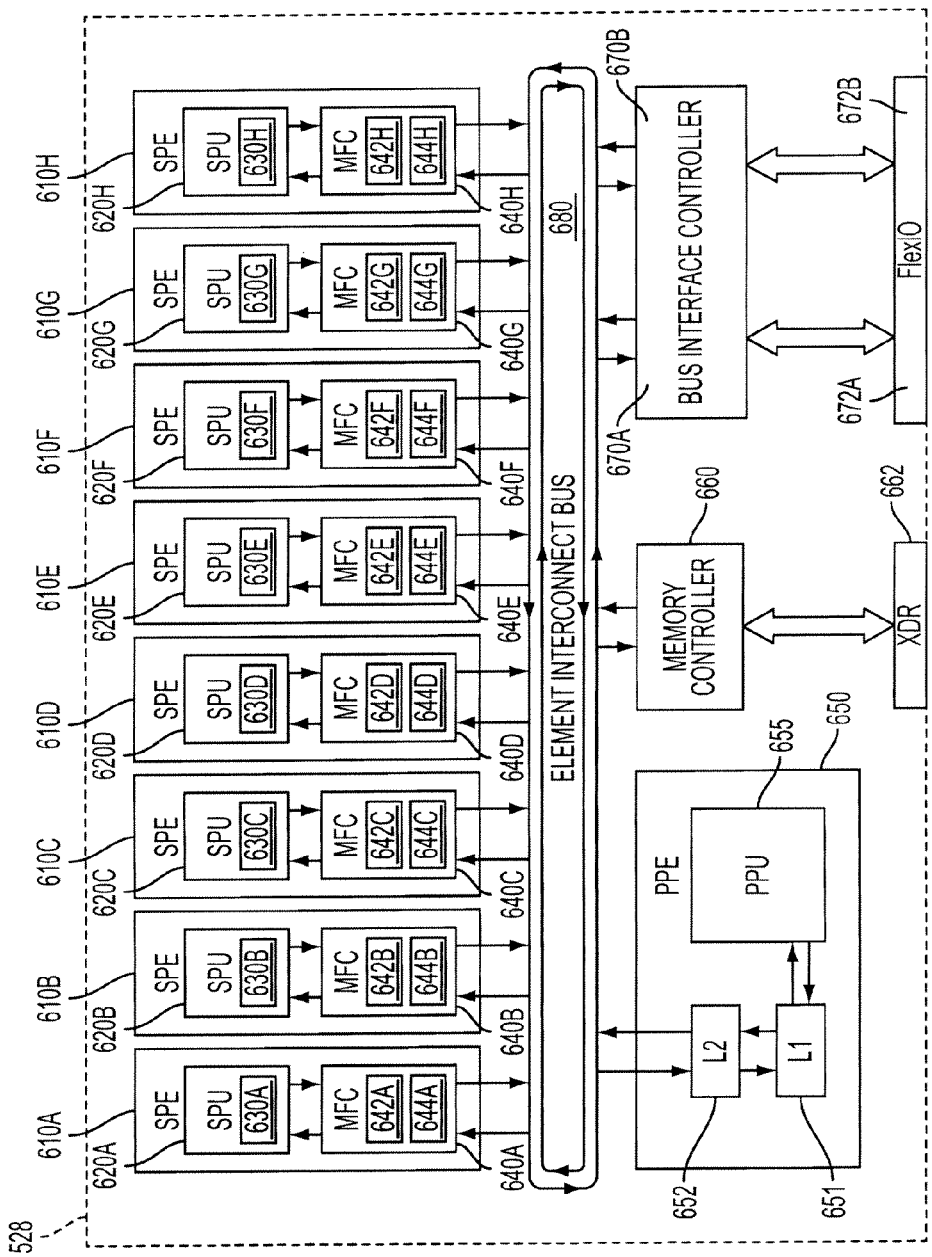
FIG. 19 illustrates additional hardware that may be used to process instructions, in accordance with an embodiment of the present invention.

FIG. 19 illustrates additional hardware that may be used to process instructions, in accordance with one embodiment of the present invention. Cell processor 528 has an architecture comprising four basic components: external input and output structures comprising a memory controller 660 and a dual bus interface controller 670A, B; a main processor referred to as the Power Processing Element 650; eight co-processors referred to as Synergistic Processing Elements (SPEs) 610A-H; and a circular data bus connecting the above components referred to as the Element Interconnect Bus 680. The total floating point performance of the Cell processor is 218 GFLOPS, compared with the 6.2 GFLOPs of the Playstation 2 device's Emotion Engine.

The Power Processing Element (PPE) 650 is based upon a two-way simultaneous multithreading Power 570 compliant PowerPC core (PPU) 655 running with an internal clock of 3.2 GHz. It comprises a 512 kB level 2 (L2) cache and a 32 kB level 1 (L1) cache. The PPE 650 is capable of eight single position operations per clock cycle, translating to 25.6 GFLOPs at 3.2 GHz. The primary role of the PPE 650 is to act as a controller for the Synergistic Processing Elements 610A-H, which handle most of the computational workload. In operation the PPE 650 maintains a job queue, scheduling jobs for the Synergistic Processing Elements 610A-H and monitoring their progress. Consequently each Synergistic Processing Element 610A-H runs a kernel whose role is to fetch a job, execute it and synchronized with the PPE 650.

Each Synergistic Processing Element (SPE) 610A-H comprises a respective Synergistic Processing Unit (SPU) 620A-H, and a respective Memory Flow Controller (MFC) 640A-H comprising in turn a respective Dynamic Memory Access Controller (DMAC) 642A-H, a respective Memory Management Unit (MMU) 644A-H and a bus interface (not shown). Each SPU 620A-H is a RISC processor clocked at 3.2 GHz and comprising 256 kB local RAM 630A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 620A-H does not directly access the system memory XDRAM 526; the 64-bit addresses formed by the SPU 620A-H are passed to the MFC 640A-H which instructs its DMA controller 642A-H to access memory via the Element Interconnect Bus 680 and the memory controller 660.

The Element Interconnect Bus (EIB) 680 is a logically circular communication bus internal to the Cell processor 528 which connects the above processor elements, namely the PPE 650, the memory controller 660, the dual bus interface 670A,B and the 8 SPEs 610A-H, totaling 12 participants. Participants can simultaneously read and write to the bus at a rate of 8 bytes per clock cycle. As noted previously, each SPE 610A-H comprises a DMAC 642A-H for scheduling longer read or write sequences. The EIB comprises four channels, two each in clockwise and anticlockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 660 comprises an XDRAM interface 662, developed by Rambus Incorporated. The memory controller interfaces with the Rambus XDRAM 526 with a theoretical peak bandwidth of 25.6 GB/s.

The dual bus interface 670A,B comprises a Rambus FlexIO® system interface 672A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 528 to the Reality Simulator graphics unit 530 will typically comprise display lists, being a sequence of commands to draw vertices, apply textures to polygons, specify lighting conditions, and so on.

Figure 20:
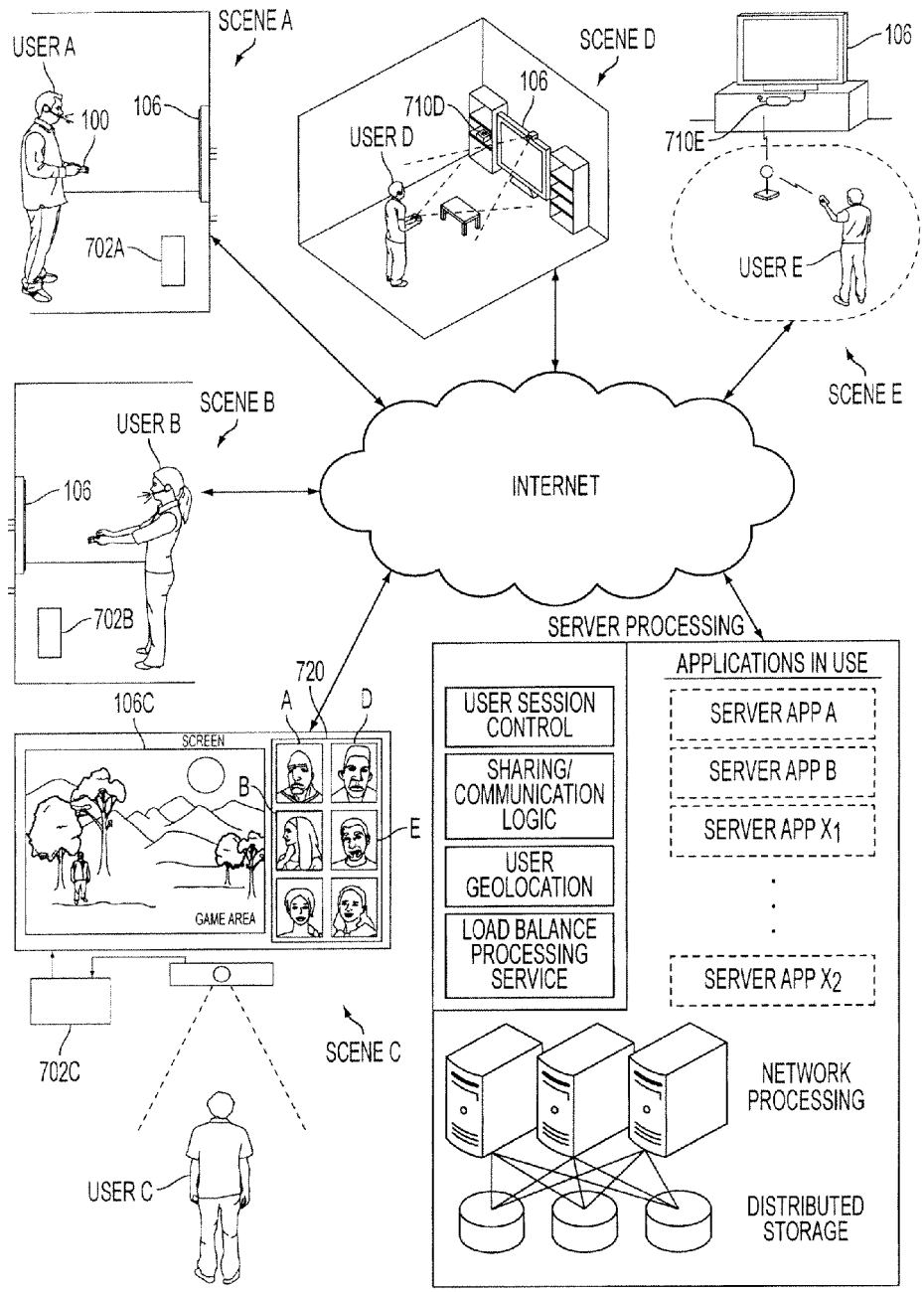
FIG. 20 illustrates a server-based game-computing system supporting multiple users simultaneously, in accordance with an embodiment of the invention.

FIG. 20 is an exemplary illustration of scene A through scene E with respective user A through user E interacting with game clients 702 that are connected to server processing via the internet, in accordance with an embodiment of the present invention. A game client is a device that allows users to connect to server applications and processing via the internet. The game client allows users to access and playback online entertainment content such as but not limited to games, movies, music and photos. Additionally, the game client can provide access to online communications applications such as VOIP, text chat protocols, and email.

A user interacts with the game client via controller. In some embodiments the controller is a game client specific controller while in other embodiments, the controller can be a keyboard and mouse combination. In one embodiment, the game client is a standalone device capable of outputting audio and video signals to create a multimedia environment through a monitor/television and associated audio equipment. For example, the game client can be, but is not limited to a thin client, an internal PCI-express card, an external PCI-express device, an ExpressCard device, an internal, external, or wireless USB device, or a Firewire device, etc. In other embodiments, the game client is integrated with a television or other multimedia device such as a DVR, Blu-Ray player, DVD player or multi-channel receiver.

Within scene A of FIG. 20, user A interacts with a client application displayed on a monitor 106 using a controller 100 paired with game client 702A. Similarly, within scene B, user B interacts with another client application that is displayed on monitor 106 using a controller 100 paired with game client 702B. Scene C illustrates a view from behind user C as he looks at a monitor displaying a game and buddy list from the game client 702C. While FIG. 20 shows a single server processing module, in one embodiment, there are multiple server processing modules throughout the world. Each server processing module includes sub-modules for user session control, sharing/communication logic, user geo-location, and load balance processing service. Furthermore, a server processing module includes network processing and distributed storage.

When a game client 702 connects to a server processing module, user session control may be used to authenticate the user. An authenticated user can have associated virtualized distributed storage and virtualized network processing. Examples items that can be stored as part of a user's virtualized distributed storage include purchased media such as, but not limited to games, videos and music etc. Additionally, distributed storage can be used to save game status for multiple games, customized settings for individual games, and general settings for the game client. In one embodiment, the user geo-location module of the server processing is used to determine the geographic location of a user and their respective game client. The user's geographic location can be used by both the sharing/communication logic and the load balance processing service to optimize performance based on geographic location and processing demands of multiple server processing modules. Virtualizing either or both network processing and network storage would allow processing tasks from game clients to be dynamically shifted to underutilized server processing module(s). Thus, load balancing can be used to minimize latency associated with both recall from storage and with data transmission between server processing modules and game clients.

As shown in FIG. 20, the server processing module has instances of server application A and server application B. The server processing module is able to support multiple server applications as indicated by server application X1 and server application X2. In one embodiment, server processing is based on cluster computing architecture that allows multiple processors within a cluster to process server applications. In another embodiment, a different type of multicomputer processing scheme is applied to process the server applications. This allows the server processing to be scaled in order to accommodate a larger number of game clients executing multiple client applications and corresponding server applications. Alternatively, server processing can be scaled to accommodate increased computing demands necessitated by more demanding graphics processing or game, video compression, or application complexity. In one embodiment, the server processing module performs the majority of the processing via the server application. This allows relatively expensive components such as graphics processors, RAM, and general processors to be centrally located and reduces to the cost of the game client. Processed server application data is sent back to the corresponding game client via the internet to be displayed on a monitor.

Scene C illustrates an exemplary application that can be executed by the game client and server processing module. For example, in one embodiment game client 702C allows user C to create and view a buddy list 720 that includes user A, user B, user D and user E. As shown, in scene C, user C is able to see either real time images or avatars of the respective user on monitor 106C. Server processing executes the respective applications of game client 702C and with the respective game clients 702 of users A, user B, user D and user E. Because the server processing is aware of the applications being executed by game client B, the buddy list for user A can indicate which game user B is playing. Further still, in one embodiment, user A can view actual in game video directly from user B. This is enabled by merely sending processed server application data for user B to game client A in addition to game client B.

In addition to being able to view video from buddies, the communication application can allow real-time communications between buddies. As applied to the previous example, this allows user A to provide encouragement or hints while watching real-time video of user B. In one embodiment two-way real time voice communication is established through a client/server application. In another embodiment, a client/server application enables text chat. In still another embodiment, a client/server application converts speech to text for display on a buddy's screen.

Scene D and scene E illustrate respective user D and user E interacting with game consoles 710D and 710E respectively. Each game console 710D and 710E are connected to the server processing module and illustrate a network where the server processing modules coordinates game play for both game consoles and game clients.

Figure 21A:
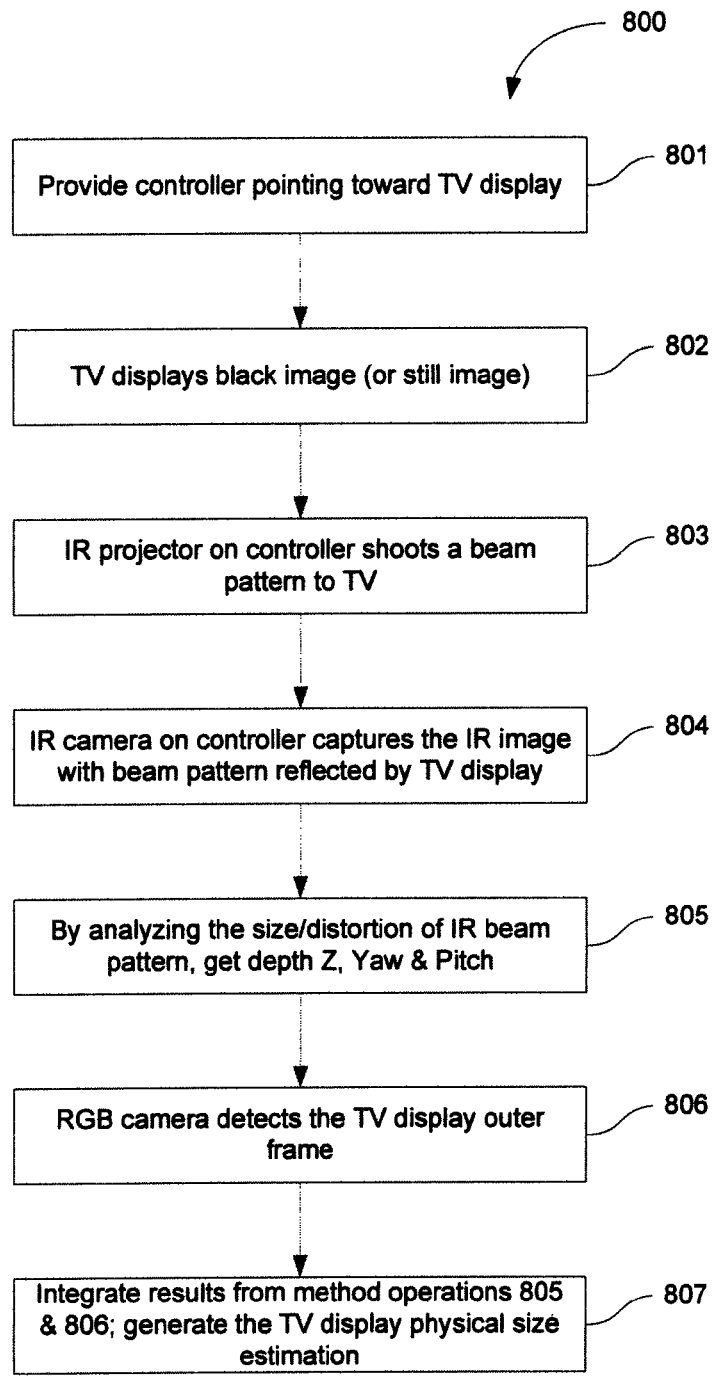
FIG. 21A illustrates a method for initializing a motion controller to determine the size of a TV display, in accordance with an embodiment of the invention.

With reference to FIG. 21A, a method 800 for initializing a motion controller to determine the size of a TV display (or other type of display) is described, in accordance with an embodiment of the invention. At method operation 801, a user holds the controller pointing toward the TV display. At method operation 802, the TV displays a black image or a still image which is used for calibration purposes. In other embodiments, the state or image displayed by the TV display can be any state (e.g. on/off, changing over time (e.g. flashing)) or image, or any level of image intensity so long as the TV display is identifiable. At method operation 803, an IR projector on the controller projects a beam pattern (or patternless) toward the TV display or in a direction where the TV display is located. At method operation 804, an IR camera on the controller captures an IR image of the beam pattern which is reflected by the TV display. At method operation 805, the captured IR image is analyzed, and based on the size/distortion of the IR beam pattern, the depth Z, yaw and pitch of the controller relative to the TV display are determined. At method operation 806, the RGB camera detects the TV display outer frame. At method operation 807, the results of method operations 805 and 806 are used to generate an estimation of the physical size of the TV display.

Figure 21B:
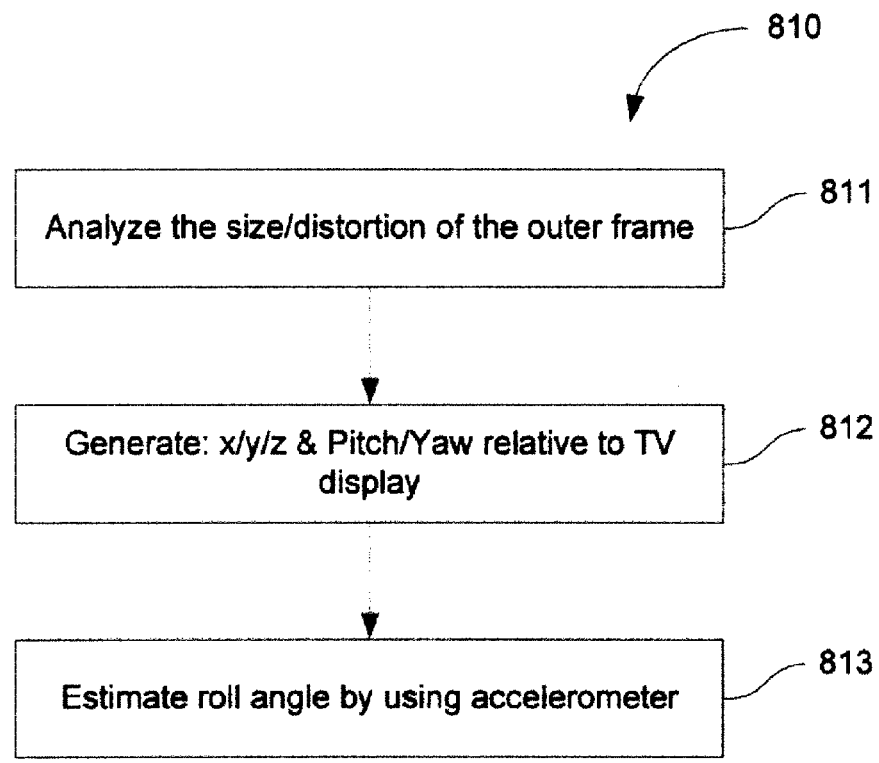
FIG. 21B illustrates a method for run-time tracking of a TV display outer frame with an RGB camera, in accordance with an embodiment of the invention.

With reference to FIG. 21B, a method 810 for run-time tracking of the TV display outer frame with the RGB camera is described, in accordance with an embodiment of the invention. At method operation 811, the size/distortion of the outer frame is analyzed. At method operation 812, the x/y/z position and pitch/yaw of the controller relative to the TV display are generated. At method operation 813, the roll angle is estimated by an accelerometer.

Figure 22:
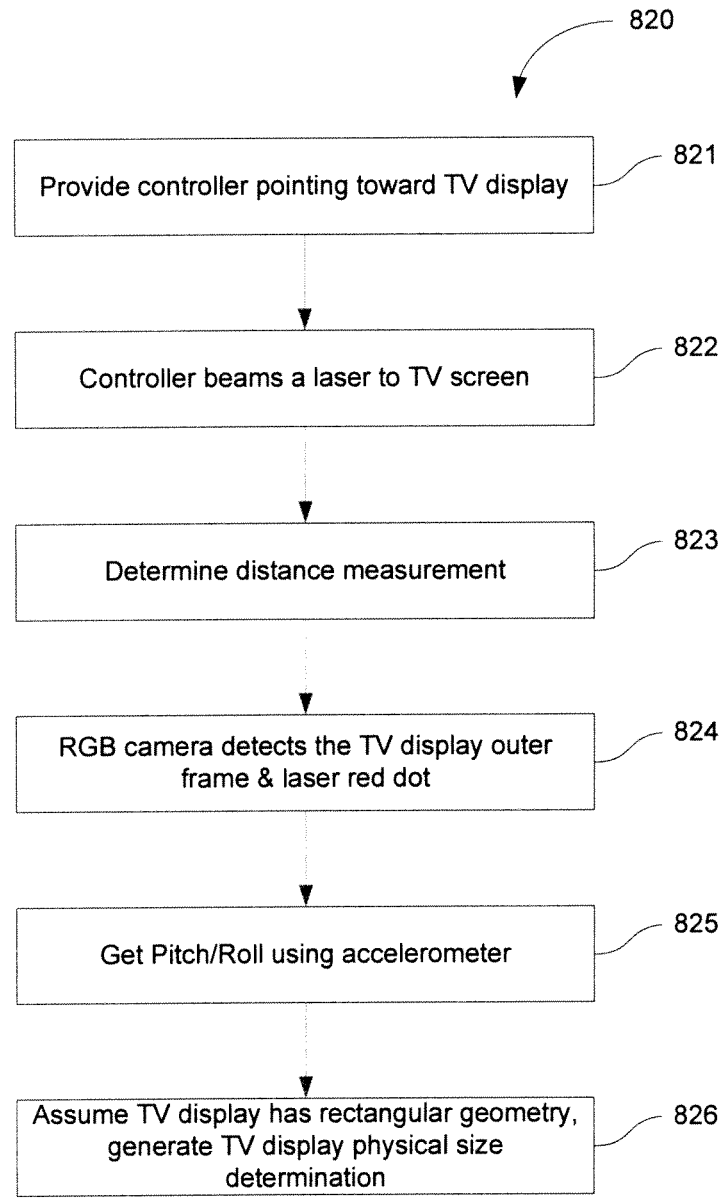
FIG. 22 illustrates a method of using a laser distance measure to calibrate TV display physical size, in accordance with an embodiment of the invention.

In another embodiment of the invention, instead of using an IR projector and an IR camera, a laser distance measure is included in the controller. With reference to FIG. 22, a method 820 of using a laser distance measure to calibrate TV display physical size is described, in accordance with an embodiment of the invention. At method operation 821, a user holds the controller pointing towards the TV display. At method operation 822, the controller beams a laser to the TV screen. At method operation 823, the distance measurement is determined. At method operation 824, an RGB camera detects the TV display outer frame and the laser dot. At method operation 825, the pitch/roll is determined using an accelerometer. At method operation 826, it is assumed that the TV display is usually of a rectangular geometry, and based on this, an estimation of the TV display's physical size is generated.

Figure 23:
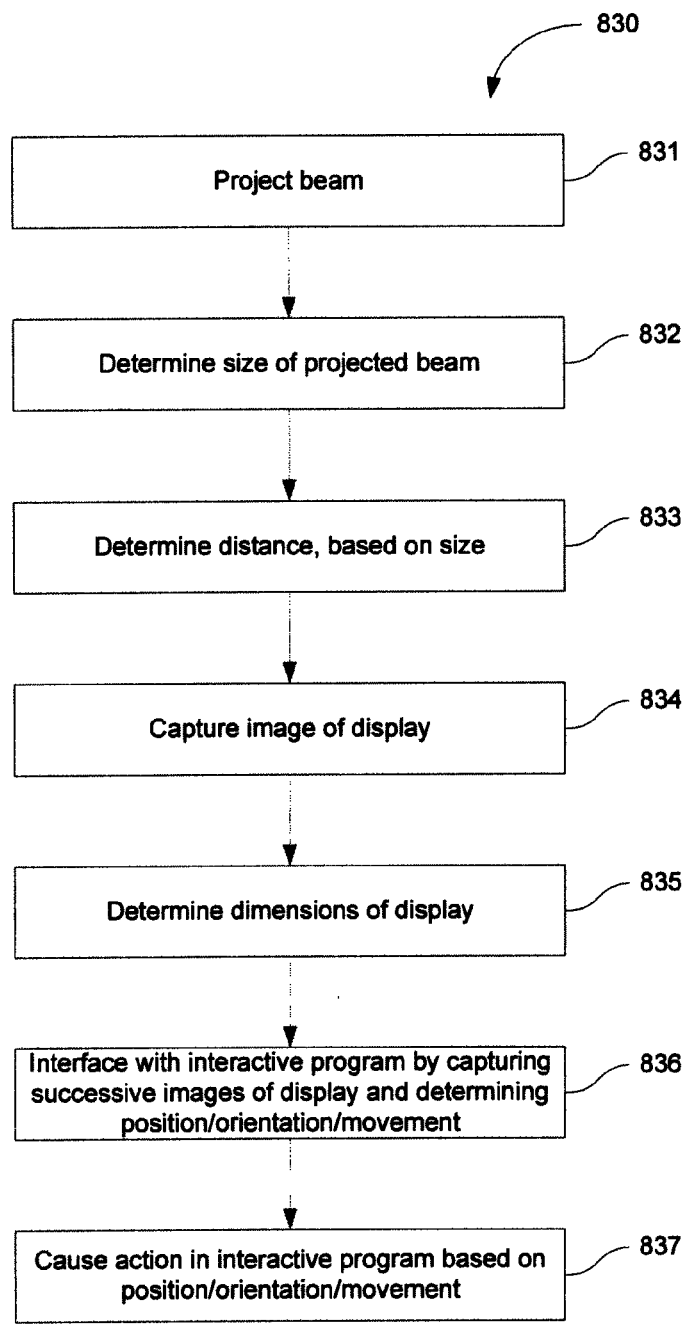
FIG. 23 illustrates a method for providing interaction with an interactive program, in accordance with an embodiment of the invention.

With reference to FIG. 23, a method 830 for providing interaction with an interactive program is described, in accordance with an embodiment of the invention. At method operation 831, a beam is projected from a controller towards a display, or in the general direction of the display. At method operation 832, the size of the projected beam is determined by examining a captured image of the projected beam. At method operation 833, a distance from the controller to the display is determined based on the determined size of the projected beam. At method operation 834, an image of the display is captured at the controller. The display may be configured to generate any type of image/video, or none at all, so as to facilitate identification of the display in the captured image of the display. At method operation 835, the dimensions of the display are determined based on an analysis of the captured image of the display and the determined distance to the display. At method operation 836, successive images of the display are captured at the controller. These successive images of the display are analyzed so as to determine position/orientation/movement of the controller. At method operation 837, the determined position/orientation/movement of the controller is provided as input to an interactive program so as to cause an action in the interactive program.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A device for enabling user control for interfacing with a video game, comprising:
   at least one inertial sensor;
   a camera configured to capture images of an interactive environment;
   an image processor configured to process the captured images for identification of trackable features;
   a transceiver configured to communicate with a game console that executes the video game, the transceiver configured to transmit data generated by the image processor to the game console, such that a position of the device is determined based on a perspective distortion of the trackable features in the captured images, the determined position of the device being utilized to update a state of the executing video game at the game console;
   a harness for attaching the device to the user;
   a projector for projecting a radiation pattern;
   a second camera for capturing images of the projected radiation pattern, wherein the position of the device is determined based on the captured images of the radiation pattern.

2. The device of claim 1,
   wherein the projector is an IR projector, and wherein the radiation pattern is an IR radiation pattern; and
   wherein the second camera is an IR camera.

3. The device of claim 1, wherein an orientation of the device is determined based on a location and orientation of the trackable features in the captured images of the interactive environment.

4. The device of claim 1, wherein the trackable features include one or more of a reflective object, a display, a portion of a display, or a rendering on a display.

5. The device of claim 1, wherein the at least one inertial sensor includes one or more of an accelerometer, gyroscope or magnetometer; and
   wherein the position of the device is determined based on data from the at least one inertial sensor.

6. The device of claim 1, further comprising one or more of
   a display screen, a speaker, a microphone, a light emitter, or a button.

7. The device of claim 1, wherein the position of the device is determined based on dimensions defined by the trackable features.

8. A method for enabling user control for interfacing with a video game, comprising:
   capturing images of an interactive environment by a camera of a device that enables the user control for interfacing with the video game, the device including a harness for attaching the device to the user;
   processing the captured images for identification of trackable features;
   communicating with a game console that executes the video game to transmit data generated by the image processor to the game console, wherein a position of the device is determined based on the trackable features in the captured images, the determined position of the device being utilized to update a state of the executing video game at the game console;
   projecting a radiation pattern from a projector of the device;
   capturing images of the projected radiation pattern by a second camera of the device, wherein the position of the device is determined based on the captured images of the radiation pattern.

9. The method of claim 8,
   wherein the projector is an IR projector, and wherein the radiation pattern is an IR radiation pattern; and
   wherein the second camera is an IR camera.

10. The method of claim 8,
    wherein when the controller device is oriented so as not to enable identification of the trackable features in the captured images of the interactive environment, then the controller device is configured to activate the projector to project the radiation pattern, and activate the second camera to capture the images of the projected radiation pattern.

11. The method of claim 8, wherein an orientation of the device is determined based on a location and orientation of the trackable features in the captured images of the interactive environment.

12. The method of claim 8, wherein the trackable features include one or more of a reflective object, a display, a portion of a display, or a rendering on a display.

13. The method of claim 8, further comprising:
    processing data from at least one inertial sensor of the device;
    wherein the position of the device is determined based on the data processed from the at least one inertial sensor.

14. The method of claim 8, further comprising:
    determining dimensions defined by the trackable features;

wherein the position of the device is determined based on the dimensions defined by the trackable features.

15. The method of claim 8, wherein the position of the device is determined based on a perspective distortion of the trackable features in the captured images.

* * * * *